US012649963B2

(12) United States Patent
Wang et al.

(10) Patent No.: US 12,649,963 B2
(45) Date of Patent: Jun. 9, 2026

(54) SPHEROIDAL TUNGSTEN CARBIDE PARTICLES

(71) Applicant: Oerlikon Metco (US) Inc., Westbury, NY (US)

(72) Inventors: Zhongming Wang, Houston, TX (US); Andy Bell, Conroe, TX (US); Zhe Zhang, Houston, TX (US); Bob Horswell, Cypress, TX (US); James Nathaniel Vecchio, San Diego, CA (US); Justin Lee Cheney, San Diego, CA (US); Roland Facundo, Splendora, TX (US)

(73) Assignee: Oerlikon Metco (US) Inc., Westbury, NY (US)

( * ) Notice: Subject to any disclaimer, the term of this patent is extended or adjusted under 35 U.S.C. 154(b) by 345 days.

(21) Appl. No.: 17/760,483

(22) PCT Filed: Feb. 23, 2021

(86) PCT No.: PCT/US2021/019170
§ 371 (c)(1),
(2) Date: Aug. 10, 2022

(87) PCT Pub. No.: WO2021/173515
PCT Pub. Date: Sep. 2, 2021

(65) Prior Publication Data
US 2023/0084878 A1 Mar. 16, 2023

Related U.S. Application Data

(60) Provisional application No. 62/981,132, filed on Feb. 25, 2020.

(51) Int. Cl.
*B22F 1/05* (2022.01)
*B22F 1/065* (2022.01)
(Continued)

(52) U.S. Cl.
CPC ................ *C22C 29/08* (2013.01); *B22F 1/05* (2022.01); *B22F 1/065* (2022.01); *B22F 3/004* (2013.01);
(Continued)

(58) Field of Classification Search
CPC .. C01B 32/949; C04B 2235/528; C22C 29/08
See application file for complete search history.

(56) References Cited

U.S. PATENT DOCUMENTS

| 2,043,952 A | 6/1936 | Ffield |
| 2,156,306 A | 5/1939 | Rapatz |
| (Continued) | | |

FOREIGN PATENT DOCUMENTS

| CN | 86102537 | 9/1987 |
| CN | 1033292 | 6/1989 |
| (Continued) | | |

OTHER PUBLICATIONS

Al-Aqeeli et al.: "Formation of an amorphous phase and its crystallization in the immiscible Nb—Zr system by mechanical alloying." Journal of Applied Physics 114, 153512, 2013.
(Continued)

*Primary Examiner* — Sally A Merkling
*Assistant Examiner* — Sean P. O'Keefe
(74) *Attorney, Agent, or Firm* — Knobbe, Martens, Olson & Bear, LLP

(57) ABSTRACT

The disclosure relates generally to tungsten carbide particles, and more particularly to textured spheroidal tungsten carbides, composites formed thereof, and methods of applying the composites. In one aspect, a powder blend comprises fused tungsten carbide particles. The fused tungsten carbide particles have a spheroidal or substantially spherical shape having ratio of a first length along a major axis to second length along a minor axis that is 1.20 or lower. The fused
(Continued)

5 μm tungsten carbide particles have a surface that is textured to have a grain boundary area fraction greater than 5.0%.

28 Claims, 12 Drawing Sheets

(51) Int. Cl.
| | |
|---|---|
| *B22F 3/00* | (2021.01) |
| *B22F 5/00* | (2006.01) |
| *C01B 32/949* | (2017.01) |
| *C22C 29/00* | (2006.01) |
| *C22C 29/08* | (2006.01) |

(52) U.S. Cl.
CPC .......... *C01B 32/949* (2017.08); *C22C 29/005* (2013.01); *B22F 2005/001* (2013.01); *B22F 2302/10* (2013.01)

(56) References Cited

U.S. PATENT DOCUMENTS

| | | | |
|---|---|---|---|
| 2,507,195 A | 5/1950 | Winearls |
| 2,608,495 A | 8/1952 | Barry |
| 2,873,187 A | 2/1959 | Dyrkaez et al. |
| 2,936,229 A | 5/1960 | Shepard |
| 3,024,137 A | 3/1962 | Witherell |
| 3,113,021 A | 12/1963 | Witherell |
| 3,181,970 A | 5/1965 | Witherell et al. |
| 3,303,063 A | 2/1967 | Pietryka et al. |
| 3,448,241 A | 6/1969 | Buckingham et al. |
| 3,554,792 A | 1/1971 | Johnson |
| 3,650,734 A | 3/1972 | Kantor et al. |
| 3,663,214 A | 5/1972 | Moore |
| 3,724,016 A | 4/1973 | Kumar et al. |
| 3,819,364 A | 6/1974 | Frehn |
| 3,843,359 A | 10/1974 | Fiene et al. |
| 3,859,060 A | 1/1975 | Eiselstein et al. |
| 3,942,954 A | 3/1976 | Frehn |
| 3,975,612 A | 8/1976 | Nakazaki et al. |
| 4,010,309 A | 3/1977 | Peterson |
| 4,017,339 A | 4/1977 | Okuda et al. |
| 4,042,383 A | 8/1977 | Petersen et al. |
| 4,066,451 A | 1/1978 | Rudy |
| 4,110,514 A | 8/1978 | Nicholson |
| 4,214,145 A | 7/1980 | Zvanut et al. |
| 4,235,630 A | 11/1980 | Babu |
| 4,240,827 A | 12/1980 | Aihara |
| 4,255,709 A | 3/1981 | Zatsepium et al. |
| 4,277,108 A | 7/1981 | Wallace |
| 4,285,725 A | 8/1981 | Gysel |
| 4,297,135 A | 10/1981 | Giessen et al. |
| 4,318,733 A | 3/1982 | Ray et al. |
| 4,362,553 A | 12/1982 | Ray |
| 4,365,994 A | 12/1982 | Ray |
| 4,415,530 A | 11/1983 | Hunt |
| 4,419,130 A | 12/1983 | Slaughter |
| 4,576,653 A | 3/1986 | Ray |
| 4,596,282 A | 6/1986 | Maddy et al. |
| 4,606,977 A | 8/1986 | Dickson et al. |
| 4,635,701 A | 1/1987 | Sare et al. |
| 4,638,847 A | 1/1987 | Day |
| 4,639,576 A | 1/1987 | Shoemaker |
| 4,666,797 A | 5/1987 | Newman et al. |
| 4,673,550 A | 6/1987 | Dallaire et al. |
| 4,762,681 A | 8/1988 | Tassen et al. |
| 4,783,218 A | 11/1988 | Kemp et al. |
| 4,803,045 A | 2/1989 | Ohriner et al. |
| 4,806,394 A | 2/1989 | Steine |
| 4,818,307 A | 4/1989 | Mori et al. |
| 4,822,415 A | 4/1989 | Dorfman et al. |
| 4,888,153 A | 12/1989 | Yabuki |
| 4,919,728 A | 4/1990 | Kohl et al. |
| 4,943,488 A | 7/1990 | Sung et al. |
| 4,957,982 A | 9/1990 | Geddes |
| 4,966,626 A | 10/1990 | Fujiki et al. |
| 4,981,644 A | 1/1991 | Chang |
| 5,094,812 A | 3/1992 | Dulmaine et al. |
| 5,252,149 A | 10/1993 | Dolman |
| 5,280,726 A | 1/1994 | Urbanic et al. |
| 5,306,358 A | 4/1994 | Lai et al. |
| 5,375,759 A | 12/1994 | Hiraishi et al. |
| 5,424,101 A | 6/1995 | Atkins |
| 5,495,837 A | 3/1996 | Mitsuhashi |
| 5,567,251 A | 10/1996 | Peker et al. |
| 5,570,636 A | 11/1996 | Lewis |
| 5,618,451 A | 4/1997 | Ni |
| 5,820,939 A | 10/1998 | Popoola et al. |
| 5,837,326 A | 11/1998 | Dallaire |
| 5,843,243 A | 12/1998 | Kawasaki et al. |
| 5,858,558 A | 1/1999 | Zhao et al. |
| 5,861,605 A | 1/1999 | Ogawa et al. |
| 5,907,017 A | 5/1999 | Ober et al. |
| 5,911,949 A | 6/1999 | Ninomiya et al. |
| 5,935,350 A | 8/1999 | Raghu et al. |
| 5,942,289 A | 8/1999 | Jackson |
| 5,976,704 A | 11/1999 | McCune |
| 5,988,302 A | 11/1999 | Sreshta et al. |
| 6,071,324 A | 6/2000 | Laul et al. |
| 6,117,493 A | 9/2000 | North |
| 6,171,222 B1 | 1/2001 | Lakeland et al. |
| 6,210,635 B1 | 4/2001 | Jackson et al. |
| 6,232,000 B1 | 5/2001 | Singh et al. |
| 6,238,843 B1 | 5/2001 | Ray |
| 6,306,524 B1 | 10/2001 | Spitsberg et al. |
| 6,326,582 B1 | 12/2001 | North |
| 6,331,688 B1 | 12/2001 | Hallén et al. |
| 6,332,936 B1 | 12/2001 | Hajaligo et al. |
| 6,375,895 B1 | 4/2002 | Daemen |
| 6,398,103 B2 | 6/2002 | Hasz et al. |
| 6,441,334 B1 | 8/2002 | Aida et al. |
| 6,582,126 B2 | 6/2003 | North |
| 6,608,286 B2 | 8/2003 | Jiang |
| 6,669,790 B1 | 12/2003 | Gundlach et al. |
| 6,689,234 B2 | 2/2004 | Branagan |
| 6,702,905 B1 | 3/2004 | Qiao et al. |
| 6,702,906 B2 | 3/2004 | Ogawa et al. |
| 6,750,430 B2 | 6/2004 | Kelly |
| 7,052,561 B2 | 5/2006 | Lu et al. |
| 7,219,727 B2 | 5/2007 | Slack et al. |
| 7,285,151 B2 | 10/2007 | Sjodin et al. |
| 7,361,411 B2 | 4/2008 | Daemen et al. |
| 7,491,910 B2 | 2/2009 | Kapoor et al. |
| 7,507,305 B2 | 3/2009 | Kawasaki et al. |
| 7,553,382 B2 | 6/2009 | Branagan et al. |
| 7,569,286 B2 | 8/2009 | Daemen et al. |
| 7,754,152 B2 | 7/2010 | Riebel et al. |
| 7,776,451 B2 | 8/2010 | Jiang et al. |
| 7,935,198 B2 | 5/2011 | Branagan et al. |
| 8,070,894 B2 | 12/2011 | Branagan |
| 8,097,095 B2 | 1/2012 | Branagan |
| 8,153,935 B2 | 4/2012 | Jang et al. |
| 8,187,529 B2 | 5/2012 | Powell |
| 8,187,725 B2 | 5/2012 | Kiser et al. |
| 8,268,453 B2 | 9/2012 | Dallaire |
| 8,474,541 B2 | 7/2013 | Branagan et al. |
| 8,562,759 B2 | 10/2013 | Cheney et al. |
| 8,562,760 B2 | 10/2013 | Cheney et al. |
| 8,640,941 B2 | 2/2014 | Cheney |
| 8,647,449 B2 | 2/2014 | Cheney et al. |
| 8,658,934 B2 | 2/2014 | Branagan et al. |
| 8,662,143 B1 | 3/2014 | Foster |
| 8,669,491 B2 | 3/2014 | Menon et al. |
| 8,702,835 B2 | 4/2014 | Yu et al. |
| 8,703,046 B2 | 4/2014 | Hanejko et al. |
| 8,704,134 B2 | 4/2014 | Branagan et al. |
| 8,777,090 B2 | 7/2014 | Miller et al. |
| 8,801,872 B2 | 8/2014 | Wright et al. |
| 8,808,471 B2 | 8/2014 | Wright et al. |
| 8,858,675 B2 | 10/2014 | Larsson |
| 8,870,997 B2 | 10/2014 | Klekovkin et al. |
| 8,901,022 B2 | 12/2014 | Francy et al. |
| 8,911,662 B2 | 12/2014 | Larsson |
| 8,920,938 B2 | 12/2014 | Hesse et al. |

(56)  References Cited

U.S. PATENT DOCUMENTS

| | | |
|---|---|---|
| 8,961,869 B2 | 2/2015 | Kapoor et al. |
| 8,973,806 B2 | 3/2015 | Cheney |
| 8,992,659 B2 | 3/2015 | Larsson et al. |
| 9,051,635 B2 | 6/2015 | Jou |
| 9,095,932 B2 | 8/2015 | Miller et al. |
| 9,145,598 B2 | 9/2015 | Oshchepkov |
| 9,174,293 B2 | 11/2015 | Meyer |
| 9,193,011 B2 | 11/2015 | Mars et al. |
| 9,233,419 B2 | 1/2016 | Gries |
| 9,255,309 B2 | 2/2016 | Aimone |
| 9,309,585 B2 | 4/2016 | Cheney et al. |
| 9,314,848 B2 | 4/2016 | Larsson |
| 9,340,855 B2 | 5/2016 | Schade et al. |
| 9,394,591 B2 | 7/2016 | Deodeshmukh et al. |
| 9,399,907 B2 | 7/2016 | Mo et al. |
| 9,469,890 B2 | 10/2016 | Bengtsson |
| 9,540,711 B2 | 1/2017 | Fifield |
| 9,580,773 B2 | 2/2017 | Aimone et al. |
| 9,631,262 B2 | 4/2017 | Wright et al. |
| 9,724,786 B2 | 8/2017 | Postle et al. |
| 9,725,793 B2 | 8/2017 | Aimone et al. |
| 9,738,959 B2 | 8/2017 | Cheney et al. |
| 9,745,648 B2 | 8/2017 | Olserius et al. |
| 9,802,387 B2 | 10/2017 | Cheney |
| 9,815,148 B2 | 11/2017 | Postle |
| 9,816,164 B2 | 11/2017 | Larsson et al. |
| 9,821,372 B2 | 11/2017 | Gries |
| 9,834,829 B1 | 12/2017 | Aimone et al. |
| 9,845,520 B2 | 12/2017 | Wright et al. |
| 9,856,546 B2 | 1/2018 | Fischer et al. |
| 9,869,132 B2 | 1/2018 | Wyble et al. |
| 9,879,333 B2 | 1/2018 | Gerk et al. |
| 9,908,816 B2 | 3/2018 | Champion et al. |
| 9,914,987 B2 | 3/2018 | Snyder et al. |
| 9,919,358 B2 | 3/2018 | Gries |
| 9,951,413 B2 | 4/2018 | Billieres |
| 9,957,590 B2 | 5/2018 | Mars et al. |
| 9,957,592 B2 | 5/2018 | Aimone et al. |
| 9,970,091 B2 | 5/2018 | Crook et al. |
| 9,994,935 B2 | 6/2018 | Wolverton et al. |
| 10,100,388 B2 | 10/2018 | Cheney |
| 10,105,796 B2 | 10/2018 | Eibl |
| 10,125,412 B2 | 11/2018 | Kaner et al. |
| 10,173,290 B2 | 1/2019 | Cheney |
| 10,252,919 B2 | 4/2019 | Billieres et al. |
| 10,329,647 B2 | 6/2019 | Cheney |
| RE47,529 E | 7/2019 | Johnson |
| 10,351,921 B2 | 7/2019 | Snyder et al. |
| 10,351,922 B2 | 7/2019 | Snyder et al. |
| 10,351,938 B2 | 7/2019 | Schade et al. |
| 10,358,699 B2 | 7/2019 | Srivastava et al. |
| 10,358,701 B2 | 7/2019 | Reed et al. |
| 10,370,740 B2 | 8/2019 | Reed et al. |
| 10,384,313 B2 | 8/2019 | Persson |
| 10,400,314 B2 | 9/2019 | Aimone et al. |
| 10,458,006 B2 | 10/2019 | Bengtsson |
| 10,465,267 B2 | 11/2019 | Cheney |
| 10,465,268 B2 | 11/2019 | Bergman |
| 10,465,269 B2 | 11/2019 | Cheney |
| 10,471,503 B2 | 11/2019 | Wright et al. |
| 10,513,758 B2 | 12/2019 | Mars |
| 10,519,529 B2 | 12/2019 | Wright et al. |
| 10,550,460 B2 | 2/2020 | Nilsson et al. |
| 10,577,680 B2 | 3/2020 | Srivastava et al. |
| 10,597,757 B2 | 3/2020 | Gong et al. |
| 10,702,918 B2 | 7/2020 | Hu |
| 10,702,924 B2 | 7/2020 | Szabo et al. |
| 10,711,329 B2 | 7/2020 | Wright et al. |
| 10,731,236 B2 | 8/2020 | Kaner et al. |
| 10,745,782 B2 | 8/2020 | Wolverton et al. |
| 10,851,444 B2 | 12/2020 | Vecchio et al. |
| 10,851,565 B1 | 12/2020 | Krueger |
| 10,872,682 B2 | 12/2020 | Reed et al. |
| 10,934,608 B2 | 3/2021 | Gu |
| 10,941,473 B2 | 3/2021 | Snyder |
| 10,954,588 B2 | 3/2021 | Cheney |
| 11,001,912 B2 | 5/2021 | Aimone et al. |
| 11,033,998 B2 | 6/2021 | Kavanaugh et al. |
| 11,085,102 B2 | 8/2021 | Cheney |
| 11,111,912 B2 | 9/2021 | Cheney |
| 11,114,226 B2 | 9/2021 | Jayaraman et al. |
| 11,118,247 B2 | 9/2021 | Gong et al. |
| 11,124,429 B2 | 9/2021 | Gore et al. |
| 11,130,205 B2 | 9/2021 | Cheney |
| 11,174,538 B2 | 11/2021 | Kaner et al. |
| 11,261,506 B2 | 3/2022 | Xu et al. |
| 11,279,996 B2 | 3/2022 | Cheney et al. |
| 11,325,189 B2 | 5/2022 | Imano et al. |
| 11,326,239 B2 | 5/2022 | Cao et al. |
| 11,353,957 B2 | 6/2022 | Border et al. |
| 11,359,268 B2 | 6/2022 | Cao et al. |
| 11,370,198 B2 | 6/2022 | Maroli et al. |
| 11,389,872 B2 | 7/2022 | Stawovy et al. |
| 2001/0019781 A1 | 9/2001 | Hasz |
| 2002/0054972 A1 | 5/2002 | Charpentier et al. |
| 2002/0060907 A1 | 5/2002 | Saccomanno |
| 2002/0098298 A1 | 7/2002 | Bolton et al. |
| 2002/0148533 A1 | 10/2002 | Kim et al. |
| 2002/0159914 A1 | 10/2002 | Yeh |
| 2003/0000339 A1 | 1/2003 | Findeisen |
| 2003/0013171 A1 | 1/2003 | Yang et al. |
| 2004/0001966 A1 | 1/2004 | Subramanian |
| 2004/0062677 A1 | 4/2004 | Chabenat et al. |
| 2004/0079742 A1 | 4/2004 | Kelly |
| 2004/0115086 A1 | 6/2004 | Chabenat et al. |
| 2004/0206726 A1 | 10/2004 | Daemen et al. |
| 2005/0047952 A1 | 3/2005 | Coleman |
| 2005/0109431 A1 | 5/2005 | Kernan et al. |
| 2005/0139294 A1 | 6/2005 | Kim et al. |
| 2005/0164016 A1 | 7/2005 | Branagan et al. |
| 2006/0063020 A1 | 3/2006 | Barbezat |
| 2006/0093752 A1 | 5/2006 | Darolia et al. |
| 2006/0163217 A1 | 7/2006 | Jiang |
| 2006/0191606 A1 | 8/2006 | Ogawa et al. |
| 2006/0260583 A1 | 11/2006 | Abi-Akar et al. |
| 2007/0026159 A1 | 2/2007 | Deem |
| 2007/0029295 A1 | 2/2007 | Branagan |
| 2007/0090167 A1 | 4/2007 | Arjakine et al. |
| 2007/0125458 A1 | 6/2007 | Kawasaki et al. |
| 2007/0187369 A1 | 8/2007 | Menon et al. |
| 2007/0219053 A1 | 9/2007 | Barufka et al. |
| 2007/0253856 A1 | 11/2007 | Vecchio et al. |
| 2007/0284018 A1 | 12/2007 | Hamano et al. |
| 2008/0001115 A1 | 1/2008 | Qiao et al. |
| 2008/0031769 A1 | 2/2008 | Yeh |
| 2008/0083391 A1 | 4/2008 | Sawada |
| 2008/0149397 A1 | 6/2008 | Overstreet |
| 2008/0199684 A1 | 8/2008 | Apte et al. |
| 2008/0241580 A1 | 10/2008 | Kiser et al. |
| 2008/0241584 A1 | 10/2008 | Daemen et al. |
| 2008/0246523 A1 | 10/2008 | Murakamo et al. |
| 2008/0253918 A1 | 10/2008 | Liang |
| 2009/0017328 A1 | 1/2009 | Katoh et al. |
| 2009/0075057 A1 | 3/2009 | Kulkarni |
| 2009/0075101 A1 | 3/2009 | Kulkarni et al. |
| 2009/0123765 A1 | 5/2009 | Branagan |
| 2009/0154183 A1 | 6/2009 | Nagai et al. |
| 2009/0252636 A1 | 10/2009 | Christopherson, Jr. et al. |
| 2009/0258250 A1 | 10/2009 | Daemen et al. |
| 2009/0285715 A1 | 11/2009 | Arjakine et al. |
| 2010/0009089 A1 | 1/2010 | Junod et al. |
| 2010/0028706 A1 | 2/2010 | Hornschu et al. |
| 2010/0044348 A1 | 2/2010 | Buchmann |
| 2010/0047622 A1 | 2/2010 | Fischer et al. |
| 2010/0055495 A1 | 3/2010 | Sjodin |
| 2010/0101780 A1 | 4/2010 | Ballew et al. |
| 2010/0132408 A1 | 6/2010 | Billieres |
| 2010/0136361 A1 | 6/2010 | Osuki et al. |
| 2010/0155236 A1 | 6/2010 | Lee et al. |
| 2010/0159136 A1 | 6/2010 | Lee et al. |
| 2010/0166594 A1 | 7/2010 | Hirata et al. |
| 2010/0189588 A1 | 7/2010 | Kawatsu et al. |
| 2010/0192476 A1 | 8/2010 | Theisen et al. |
| 2010/0258217 A1 | 10/2010 | Kuehmann |

(56) References Cited

U.S. PATENT DOCUMENTS

| | | |
|---|---|---|
| 2011/0004069 A1 | 1/2011 | Ochs et al. |
| 2011/0031222 A1 | 2/2011 | Branagan et al. |
| 2011/0048587 A1 | 3/2011 | Vecchio et al. |
| 2011/0064963 A1 | 3/2011 | Cheney et al. |
| 2011/0139761 A1 | 6/2011 | Sugahara et al. |
| 2011/0142713 A1 | 6/2011 | Kawasaki et al. |
| 2011/0162612 A1 | 7/2011 | Qiao et al. |
| 2011/0171485 A1 | 7/2011 | Kawamoto et al. |
| 2011/0220415 A1 | 9/2011 | Jin et al. |
| 2012/0055899 A1 | 3/2012 | Parmaningsih |
| 2012/0055903 A1 | 3/2012 | Izutani et al. |
| 2012/0100390 A1 | 4/2012 | Kuroda |
| 2012/0103456 A1 | 5/2012 | Smith et al. |
| 2012/0156020 A1 | 6/2012 | Kottilingam et al. |
| 2012/0160363 A1 | 6/2012 | Jin et al. |
| 2012/0258273 A1 | 10/2012 | Churchill et al. |
| 2012/0288400 A1 | 11/2012 | Hirata et al. |
| 2013/0039800 A1 | 2/2013 | Dolman |
| 2013/0094900 A1 | 4/2013 | Folkmann et al. |
| 2013/0108502 A1 | 5/2013 | Bei |
| 2013/0167965 A1 | 7/2013 | Cheney et al. |
| 2013/0171367 A1 | 7/2013 | Kusinski et al. |
| 2013/0174612 A1 | 7/2013 | Linnot et al. |
| 2013/0216722 A1 | 8/2013 | Kusinski et al. |
| 2013/0220523 A1 | 8/2013 | Cheney |
| 2013/0224516 A1 | 8/2013 | Kusinski et al. |
| 2013/0260177 A1 | 10/2013 | Wallin et al. |
| 2013/0266798 A1 | 10/2013 | Cheney |
| 2013/0266820 A1 | 10/2013 | Kusinski et al. |
| 2013/0294962 A1 | 11/2013 | Wallin et al. |
| 2014/0024509 A1 | 1/2014 | Gerschefske |
| 2014/0044587 A1 | 2/2014 | Crook et al. |
| 2014/0044617 A1 | 2/2014 | Dreisinger |
| 2014/0060707 A1 | 3/2014 | Wright et al. |
| 2014/0066851 A1 | 3/2014 | Cheney, II |
| 2014/0116575 A1 | 5/2014 | Cheney et al. |
| 2014/0131338 A1 | 5/2014 | Postle |
| 2014/0190594 A1 | 7/2014 | Branagan et al. |
| 2014/0219859 A1 | 8/2014 | Cheney |
| 2014/0234154 A1 | 8/2014 | Cheney et al. |
| 2014/0248509 A1 | 9/2014 | Cheney et al. |
| 2014/0263248 A1 | 9/2014 | Postle |
| 2014/0272388 A1 | 9/2014 | Knight et al. |
| 2014/0295194 A1 | 10/2014 | Yoshitaka et al. |
| 2014/0322064 A1 | 10/2014 | Gerk et al. |
| 2014/0356223 A1 | 12/2014 | Nilsson et al. |
| 2015/0004337 A1 | 1/2015 | Zimmermann et al. |
| 2015/0075681 A1 | 3/2015 | Wright et al. |
| 2015/0086413 A1 | 3/2015 | Wolverton et al. |
| 2015/0106035 A1 | 4/2015 | Vecchio et al. |
| 2015/0114525 A1 | 4/2015 | Valls Anglés |
| 2015/0118098 A1 | 4/2015 | Valls |
| 2015/0122552 A1 | 5/2015 | Wang et al. |
| 2015/0152994 A1 | 6/2015 | Bondil et al. |
| 2015/0252631 A1 | 9/2015 | Miller |
| 2015/0275341 A1 | 10/2015 | Cheney |
| 2015/0284817 A1 | 10/2015 | Snyder et al. |
| 2015/0284829 A1 | 10/2015 | Cheney |
| 2015/0307968 A1 | 10/2015 | Mars et al. |
| 2015/0328680 A1 | 11/2015 | Tuffile |
| 2015/0367454 A1 | 12/2015 | Cheney |
| 2016/0001368 A1 | 1/2016 | Gries et al. |
| 2016/0002752 A1 | 1/2016 | Srivastava et al. |
| 2016/0002764 A1 | 1/2016 | Gries et al. |
| 2016/0017463 A1 | 1/2016 | Cheney |
| 2016/0024628 A1 | 1/2016 | Cheney |
| 2016/0040262 A1 | 2/2016 | Snyder et al. |
| 2016/0083830 A1 | 3/2016 | Cheney |
| 2016/0114392 A1 | 4/2016 | Berg et al. |
| 2016/0138144 A1 | 5/2016 | Olsérius |
| 2016/0144463 A1 | 5/2016 | Hellsten et al. |
| 2016/0195216 A1 | 7/2016 | Bondil et al. |
| 2016/0201169 A1 | 7/2016 | Vecchio |
| 2016/0201170 A1 | 7/2016 | Vecchio |
| 2016/0215374 A1 | 7/2016 | Schade et al. |
| 2016/0222490 A1 | 8/2016 | Wright et al. |
| 2016/0243616 A1 | 8/2016 | Gries |
| 2016/0258044 A1 | 9/2016 | Litström et al. |
| 2016/0271736 A1 | 9/2016 | Han et al. |
| 2016/0289001 A1 | 10/2016 | Shibata et al. |
| 2016/0289798 A1 | 10/2016 | Deodeshmukh et al. |
| 2016/0289799 A1 | 10/2016 | Crook et al. |
| 2016/0289803 A1 | 10/2016 | Cheney |
| 2016/0329139 A1 | 11/2016 | Jayaraman |
| 2016/0376686 A1 | 12/2016 | Jou |
| 2017/0009324 A1 | 1/2017 | Crook et al. |
| 2017/0014865 A1 | 1/2017 | Kusinski et al. |
| 2017/0022588 A1 | 1/2017 | Tang et al. |
| 2017/0044646 A1 | 2/2017 | Gong et al. |
| 2017/0044647 A1* | 2/2017 | Olsen ................. C22C 32/0052 |
| 2017/0145547 A1 | 5/2017 | Saal et al. |
| 2017/0253950 A1 | 9/2017 | Shinohara |
| 2017/0275740 A1 | 9/2017 | Bergman |
| 2018/0016664 A1 | 1/2018 | Hu |
| 2018/0021894 A1 | 1/2018 | Persoon et al. |
| 2018/0066343 A1 | 3/2018 | Bengtsson |
| 2018/0066345 A1 | 3/2018 | Cheney et al. |
| 2018/0094343 A1 | 4/2018 | Gerk et al. |
| 2018/0099877 A1 | 4/2018 | Chang et al. |
| 2018/0135143 A1 | 5/2018 | Snyder et al. |
| 2018/0195156 A1 | 7/2018 | Reed et al. |
| 2018/0216212 A1 | 8/2018 | Reed et al. |
| 2018/0230016 A1 | 8/2018 | Kaner et al. |
| 2018/0230578 A1 | 8/2018 | Srivastava et al. |
| 2018/0245190 A1 | 8/2018 | Snyder et al. |
| 2018/0265949 A1 | 9/2018 | Wolverton et al. |
| 2018/0272423 A1 | 9/2018 | Hu |
| 2019/0017154 A1 | 1/2019 | Kaner et al. |
| 2019/0024217 A1 | 1/2019 | Yolton |
| 2019/0055860 A1 | 2/2019 | Jones |
| 2019/0071318 A1 | 3/2019 | Kaner et al. |
| 2019/0084039 A1 | 3/2019 | Hu |
| 2019/0128072 A1* | 5/2019 | Griffo .................... E21B 10/42 |
| 2019/0135646 A1 | 5/2019 | Turner et al. |
| 2019/0177820 A1 | 6/2019 | Larsson |
| 2019/0234151 A1 | 8/2019 | Olsen et al. |
| 2019/0300374 A1 | 10/2019 | Shevchenko et al. |
| 2019/0309399 A1 | 10/2019 | Badwe |
| 2019/0323107 A1 | 10/2019 | Srivastava et al. |
| 2019/0368014 A1 | 12/2019 | Liimatainen |
| 2019/0376165 A1 | 12/2019 | Wen |
| 2020/0001367 A1 | 1/2020 | Duffy et al. |
| 2020/0005975 A1 | 1/2020 | Jayaraman et al. |
| 2020/0048743 A1 | 2/2020 | Gong et al. |
| 2020/0063238 A1 | 2/2020 | Yolton |
| 2020/0063239 A1 | 2/2020 | Xu et al. |
| 2020/0078860 A1 | 3/2020 | Wright et al. |
| 2020/0149141 A1 | 5/2020 | Wu et al. |
| 2020/0172998 A1 | 6/2020 | Crudden et al. |
| 2020/0189918 A1 | 6/2020 | Saeuberlich et al. |
| 2020/0223007 A1 | 7/2020 | Keegan et al. |
| 2020/0308679 A1 | 10/2020 | Nymann |
| 2020/0316718 A1 | 10/2020 | Smathers |
| 2020/0325561 A1 | 10/2020 | Kaner |
| 2020/0370149 A1 | 11/2020 | Gong |
| 2020/0385845 A1 | 12/2020 | Gong |
| 2021/0040585 A1 | 2/2021 | Alabort |
| 2021/0046543 A1 | 2/2021 | Larsson |
| 2021/0062305 A1 | 3/2021 | Fang |
| 2021/0164081 A1 | 6/2021 | Eibl |
| 2021/0180157 A1 | 6/2021 | Bracci |
| 2021/0180162 A1 | 6/2021 | Vecchio |
| 2021/0180170 A1 | 6/2021 | Pike |
| 2021/0197524 A1 | 7/2021 | Maroli et al. |
| 2021/0222275 A1 | 7/2021 | Saboo et al. |
| 2021/0246537 A1 | 8/2021 | Maroli et al. |
| 2021/0254202 A1 | 8/2021 | Gong et al. |
| 2021/0262050 A1 | 8/2021 | Oshchepkov et al. |
| 2021/0286079 A1 | 9/2021 | Vecchio |
| 2021/0310106 A1 | 10/2021 | Wei et al. |
| 2021/0324498 A1 | 10/2021 | Hericher et al. |
| 2021/0332465 A1 | 10/2021 | Behera et al. |
| 2021/0387920 A1 | 12/2021 | Bouttes et al. |
| 2021/0402475 A1 | 12/2021 | Taneike et al. |

(56) References Cited

U.S. PATENT DOCUMENTS

| | | | |
|---|---|---|---|
| 2022/0025492 A1 | 1/2022 | Schade et al. | |
| 2022/0041449 A1 | 2/2022 | Larsson et al. | |
| 2022/0081745 A1 | 3/2022 | Komai et al. | |
| 2022/0165463 A1 | 5/2022 | Vidarsson et al. | |
| 2022/0219231 A1 | 7/2022 | Eibl | |
| 2022/0220583 A1 | 7/2022 | Ota et al. | |
| 2022/0220584 A1 | 7/2022 | Wang et al. | |
| 2022/0404035 A1 | 12/2022 | Gattei | |

FOREIGN PATENT DOCUMENTS

| | | | |
|---|---|---|---|
| CN | 1225629 C | 11/2005 | |
| CN | 101016603 | 8/2007 | |
| CN | 101148747 | 3/2008 | |
| CN | 101948994 | 1/2011 | |
| CN | 101994076 | 3/2011 | |
| CN | 102233490 A | 11/2011 | |
| CN | 102286702 | 12/2011 | |
| CN | 102357750 A | 2/2012 | |
| CN | 102936724 | 2/2013 | |
| CN | 103628017 | 3/2014 | |
| CN | 103785967 | 5/2014 | |
| CN | 104093510 | 10/2014 | |
| CN | 104625473 | 5/2015 | |
| CN | 104694840 | 6/2015 | |
| CN | 104805391 | 7/2015 | |
| CN | 105057913 | 11/2015 | |
| CN | 105483539 | 4/2016 | |
| CN | 106119838 | 11/2016 | |
| CN | 108607983 | 10/2018 | |
| DE | 27 54 437 | 7/1979 | |
| DE | 33 20 513 | 12/1983 | |
| DE | 42 02 828 | 8/1993 | |
| DE | 4411296 | 7/1995 | |
| DE | 10 320 397 A1 | 12/2004 | |
| DE | 10329912 | 6/2005 | |
| EP | 0 346 293 | 12/1989 | |
| EP | 0 365 884 | 5/1990 | |
| EP | 0 774 528 | 5/1997 | |
| EP | 0 740 591 | 3/1999 | |
| EP | 1 077 268 | 2/2001 | |
| EP | 0 939 139 | 10/2001 | |
| EP | 1 270 755 | 1/2003 | |
| EP | 1 279 748 | 1/2003 | |
| EP | 1 279 749 | 1/2003 | |
| EP | 1 120 472 | 7/2003 | |
| EP | 1 477 579 | 11/2004 | |
| EP | 1 361 288 | 9/2006 | |
| EP | 1 721 999 | 11/2006 | |
| EP | 1 857 204 | 11/2007 | |
| EP | 1 694 876 | 1/2008 | |
| EP | 1 953 252 | 8/2008 | |
| EP | 2 050 533 | 4/2009 | |
| EP | 2 305 415 | 4/2011 | |
| EP | 2 388 345 | 11/2011 | |
| EP | 2 628 825 | 8/2013 | |
| EP | 2 639 323 | 9/2013 | |
| EP | 2 660 342 | 11/2013 | |
| EP | 2 072 627 | 4/2014 | |
| EP | 2 730 355 | 5/2014 | |
| EP | 2 743 361 | 6/2014 | |
| EP | 2 104 753 | 7/2014 | |
| EP | 2 777 869 | 9/2014 | |
| EP | 2 778 247 | 9/2014 | |
| EP | 2 873 747 | 5/2015 | |
| EP | 2 563 942 | 10/2015 | |
| EP | 2 064 359 | 4/2016 | |
| EP | 3 034 211 | 6/2016 | |
| EP | 2 235 225 | 10/2016 | |
| EP | 3 093 858 | 11/2016 | |
| EP | 2 659 014 | 4/2017 | |
| EP | 3 156 155 | 4/2017 | |
| EP | 2 147 445 | 5/2017 | |
| EP | 2 252 419 | 6/2017 | |
| EP | 2 265 559 | 6/2017 | |
| EP | 2 329 507 | 6/2017 | |
| EP | 2 285 996 | 8/2017 | |
| EP | 3 211 108 | 8/2017 | |
| EP | 1 700 319 | 10/2017 | |
| EP | 2 207 907 | 12/2017 | |
| EP | 2 788 136 | 1/2018 | |
| EP | 2 414 554 B1 | 2/2018 | |
| EP | 3 145 660 | 4/2018 | |
| EP | 2 432 908 B1 | 5/2018 | |
| EP | 2 181 199 | 8/2018 | |
| EP | 2 477 784 | 8/2018 | |
| EP | 2 695 171 | 8/2018 | |
| EP | 3 354 758 | 8/2018 | |
| EP | 1 799 380 | 9/2018 | |
| EP | 3 034 637 B1 | 10/2018 | |
| EP | 3 266 892 | 10/2018 | |
| EP | 3 444 452 | 2/2019 | |
| EP | 2 265 739 | 6/2019 | |
| EP | 3 259 095 | 6/2019 | |
| EP | 1 844 172 | 7/2019 | |
| EP | 3 517 642 | 7/2019 | |
| EP | 3 115 472 | 10/2019 | |
| EP | 3 552 740 | 10/2019 | |
| EP | 2 155 921 | 11/2019 | |
| EP | 3 350 354 | 2/2020 | |
| EP | 3 611 280 | 2/2020 | |
| EP | 3 354 764 | 3/2020 | |
| EP | 3 149 216 | 4/2020 | |
| EP | 2 403 966 B1 | 5/2020 | |
| EP | 3 362 210 | 5/2020 | |
| EP | 3 134 558 | 7/2020 | |
| EP | 3 514 253 B1 | 10/2020 | |
| EP | 3 333 275 | 11/2020 | |
| EP | 3 653 736 | 12/2020 | |
| EP | 3 411 169 | 1/2021 | |
| EP | 3590642 B1 * | 1/2021 | ........... B22F 1/0011 |
| EP | 1 848 836 B1 | 4/2021 | |
| EP | 3 822 007 | 5/2021 | |
| EP | 2 671 669 | 6/2021 | |
| EP | 3 925 771 | 12/2021 | |
| EP | 3 926 064 | 12/2021 | |
| EP | 3 991 879 | 5/2022 | |
| EP | 3 995 234 | 5/2022 | |
| FR | 1398732 | 5/1965 | |
| FR | 2055735 | 4/1971 | |
| FR | 2218797 | 9/1974 | |
| GB | 465999 | 5/1937 | |
| GB | 956740 | 4/1964 | |
| GB | 1073621 | 6/1967 | |
| GB | 2153846 A | 8/1985 | |
| GB | 2273109 | 6/1994 | |
| GB | 2546809 | 5/2018 | |
| GB | 2579580 | 7/2020 | |
| GB | 2567492 | 9/2020 | |
| GB | 2584654 | 12/2020 | |
| GB | 2584905 | 12/2020 | |
| IN | MUMNP-2003-00842 | 4/2005 | |
| JP | 43-019745 | 8/1968 | |
| JP | 45-026214 | 10/1970 | |
| JP | 47-1685 | 1/1972 | |
| JP | 49-056839 | 6/1974 | |
| JP | 58-132393 | 8/1983 | |
| JP | 59-16951 | 1/1984 | |
| JP | 59-16952 | 1/1984 | |
| JP | 59-150692 | 8/1984 | |
| JP | 60-133996 | 7/1985 | |
| JP | 6031897 B1 | 7/1985 | |
| JP | 61-283489 | 12/1986 | |
| JP | 63-026205 | 2/1988 | |
| JP | 63-42357 | 2/1988 | |
| JP | 63-65056 | 3/1988 | |
| JP | 63-089643 | 4/1988 | |
| JP | 63-213628 | 9/1988 | |
| JP | 03-133593 | 6/1991 | |
| JP | 03-248799 | 11/1991 | |
| JP | 04-237592 | 8/1992 | |
| JP | 04-246142 | 9/1992 | |
| JP | 04-358046 | 12/1992 | |
| JP | 07-179997 | 7/1995 | |

(56) References Cited

FOREIGN PATENT DOCUMENTS

| | | |
|---|---|---|
| JP | 07-268524 | 10/1995 |
| JP | 08-134570 | 5/1996 |
| JP | 09-95755 | 4/1997 |
| JP | 09-108887 | 4/1997 |
| JP | 2001-066130 | 3/2001 |
| JP | 2001-303233 | 10/2001 |
| JP | 2002-241919 | 8/2002 |
| JP | 2003-205352 | 7/2003 |
| JP | 2004-149924 | 5/2004 |
| JP | 2005-042152 | 2/2005 |
| JP | 2005-290406 | 10/2005 |
| JP | 2007-154284 | 6/2007 |
| JP | 2008-261329 | 10/2008 |
| JP | 2010-138440 | 6/2010 |
| JP | 2010-138491 | 6/2010 |
| JP | 2012-000616 | 1/2012 |
| JP | 2014-047388 | 3/2014 |
| JP | 2015-083715 | 4/2015 |
| JP | 2015-526596 | 9/2015 |
| KR | 10-0935816 B1 | 1/2010 |
| SU | 1706398 | 1/1992 |
| TW | 200806801 A | 2/2008 |
| WO | WO 84/000385 | 2/1984 |
| WO | WO 84/004760 | 12/1984 |
| WO | WO 95/004628 | 2/1995 |
| WO | WO 03/018856 | 3/2003 |
| WO | WO 06/080978 | 8/2006 |
| WO | WO 06/086350 | 8/2006 |
| WO | WO 07/120194 | 10/2007 |
| WO | WO 08/042330 | 4/2008 |
| WO | WO 08/060226 | 5/2008 |
| WO | WO 08/082353 | 7/2008 |
| WO | WO 08/105788 | 9/2008 |
| WO | WO 08/153499 | 12/2008 |
| WO | WO 09/085000 | 7/2009 |
| WO | WO 10/044740 | 4/2010 |
| WO | WO 10/046224 | 4/2010 |
| WO | WO 10/074634 | 7/2010 |
| WO | WO 10/134886 | 11/2010 |
| WO | WO 11/005403 | 1/2011 |
| WO | WO 11/021751 | 2/2011 |
| WO | WO 11/071054 | 6/2011 |
| WO | WO 11/084213 | 7/2011 |
| WO | WO 11/091479 | 8/2011 |
| WO | WO 11/152774 | 12/2011 |
| WO | WO 11/158706 | 12/2011 |
| WO | WO 12/021186 | 2/2012 |
| WO | WO 12/022874 | 2/2012 |
| WO | WO 12/112844 | 8/2012 |
| WO | WO 12/162226 | 11/2012 |
| WO | WO 13/049056 | 4/2013 |
| WO | WO 13/055652 | 4/2013 |
| WO | WO 13/060839 | 5/2013 |
| WO | WO 13/102650 | 7/2013 |
| WO | WO 13/126134 | 8/2013 |
| WO | WO 13/152306 | 10/2013 |
| WO | WO 13/167580 | 11/2013 |
| WO | WO 13/167628 | 11/2013 |
| WO | WO 13/185174 | 12/2013 |
| WO | WO 14/001544 | 1/2014 |
| WO | WO 14/023646 | 2/2014 |
| WO | WO 14/070006 | 5/2014 |
| WO | WO 14/081491 | 5/2014 |
| WO | WO 14/083544 | 6/2014 |
| WO | WO 14/085319 | 6/2014 |
| WO | WO 14/090922 | 6/2014 |
| WO | WO 14/114714 | 7/2014 |
| WO | WO 14/114715 | 7/2014 |
| WO | WO 14/187867 | 11/2014 |
| WO | WO 14/197088 | 12/2014 |
| WO | WO 14/201239 | 12/2014 |
| WO | WO 14/202488 | 12/2014 |
| WO | WO 15/028358 | 3/2015 |
| WO | WO 15/049309 | 4/2015 |
| WO | WO 15/075122 | 5/2015 |
| WO | WO 15/183955 | 12/2015 |
| WO | WO 16/003520 | 1/2016 |
| WO | WO 16/010599 | 1/2016 |
| WO | WO 16/041977 | 3/2016 |
| WO | WO 16/099390 | 6/2016 |
| WO | WO 16/124532 | 8/2016 |
| WO | WO 16/131702 | 8/2016 |
| WO | WO 17/041006 | 3/2017 |
| WO | WO 17/046517 | 3/2017 |
| WO | WO 17/059026 | 4/2017 |
| WO | WO 17/063923 | 4/2017 |
| WO | WO 17/091743 | 6/2017 |
| WO | WO 17/132286 | 8/2017 |
| WO | WO 17/132322 | 8/2017 |
| WO | WO 17/134039 | 8/2017 |
| WO | WO 17/157835 | 9/2017 |
| WO | WO 17/162499 | 9/2017 |
| WO | WO 17/186468 | 11/2017 |
| WO | WO 17/200797 | 11/2017 |
| WO | WO 18/015547 | 1/2018 |
| WO | WO 18/021409 | 2/2018 |
| WO | WO 18/050474 | 3/2018 |
| WO | WO 18/065614 | 4/2018 |
| WO | WO 18/004179 | 6/2018 |
| WO | WO 18/114845 | 6/2018 |
| WO | WO 18/138247 | 8/2018 |
| WO | WO 18/138270 | 8/2018 |
| WO | WO 18/145032 | 8/2018 |
| WO | WO 18/232618 | 12/2018 |
| WO | WO-2018232619 A1 * | 12/2018 .............. B22F 3/115 |
| WO | WO 19/021015 | 1/2019 |
| WO | WO 19/043219 | 3/2019 |
| WO | WO 19/047587 | 3/2019 |
| WO | WO 19/108596 | 6/2019 |
| WO | WO 19/125637 | 6/2019 |
| WO | WO 19/145196 | 8/2019 |
| WO | WO 19/166749 | 9/2019 |
| WO | WO 19/194869 | 10/2019 |
| WO | WO 19/197376 | 10/2019 |
| WO | WO 19/215450 | 11/2019 |
| WO | WO 20/007652 | 1/2020 |
| WO | WO 20/043718 | 3/2020 |
| WO | WO 20/053518 | 3/2020 |
| WO | WO 20/065296 | 4/2020 |
| WO | WO 20/065297 | 4/2020 |
| WO | WO 20/074241 | 4/2020 |
| WO | WO 20/115478 | 6/2020 |
| WO | WO 20/120563 | 6/2020 |
| WO | WO 20/201437 | 10/2020 |
| WO | WO 20/201438 | 10/2020 |
| WO | WO 21/089851 | 5/2021 |
| WO | WO 21/217512 | 11/2021 |
| WO | WO 21/219564 | 11/2021 |
| WO | WO 21/231285 | 11/2021 |
| WO | WO 21/247981 | 12/2021 |
| WO | WO 22/113466 | 6/2022 |
| WO | WO 22/149539 | 7/2022 |

OTHER PUBLICATIONS

Audouard, et al., Mar. 26-31, 2000, Corrosion Performance and Field Experience With Super Duplex and Super Austenitic Stainless Steels in FGD Systems, Corrosion 2000, 8 pp.

Azo Materials, "Stainless Steel—Grade 420," Oct. 23, 2001, <https://www.azom.com/article.aspx?ArticleID=972>, accessed Aug. 15, 2017.

Branagan, et al.: Developing extreme hardness (>15GPa) in iron based nanocomosites, Composites Part A: Applied Science and Manufacturing, Elsevier Science Publishers B.V., Amsterdam, NL, vol. 33, No. 6, Jun. 1, 2002, pp. 855-859.

Chen et al.: "Characterization of Microstructure and Mechanical Properties of High Chromium Cast Irons Using SEM and Nanoindentation," JMEPEG 2015 (published online Oct. 30, 2014), vol. 24(1), pp. 98-105.

Cheney, et al.: "Development of quaternary Fe-based bulk metallic glasses," Materials Science and Engineering, vol. 492, No. 1-2, Sep. 25, 2008, pp. 230-235.

(56)          References Cited

OTHER PUBLICATIONS

Cheney: Modeling the Glass Forming Ability of Metals. A Dissertation submitted in partial satisfaction of the Requirements for the degree of Doctor of Philosophy. University of California, San Diego. Dec. 2007.

C—Mo Phase Diagram [online], [retrieved on Jan. 27, 2015]. Retrieved from the Internet: <URL:http://factsage.cn/fact/documentation/SGTE/C-Mo.jpg.

C—Nb Phase Diagram [online], [retrieved on Jan. 27, 2015]. Retrieved from the Internet: <URL:http://www.crct.polymtl.ca/fact/documentation/BINARY/C-Nb.jpg.

Conversion Chart of Vickers Hardness (HV) to Rockwell C (HCR). Cr—C Phase Diagram [online], [retrieved on Jan. 27, 2015]. Retrieved from the Internet: http://www.azom.com/work/3ud2quvLOU9g4VBMjVEh_files/image002.gif.

Crucible Industries LLC, Jun. 3, 2010, Crucible CPM S90V® data sheet, retrieved from the internet Mar. 14, 2019, https://www.crucible.com/PDFs/DataSheets2010/dsS90v1%202010.pdf, 2 pp.

Davis, Jr, ed. Dec. 1994, Stainless steels. ASM International, Materials Park, OH, p. 447.

Fujiki et al., 1988, The sintering phenomena and heat-treated properties of carbides and borides precipitated p/m alloys made of H.S.S. powder, Japan Society of Powder and Powder Metallurgy, 35(3):119-123.

Gorni, Oct. 9, 2003, Austenite transformation temperatures: ferrite start and finish, in Steel Forming and Heath Treating Handbook, pp. 26-43.

Iron-Carbon (Fe—C) Phase diagram [online], [retrieved on Jan. 27, 2015]. Retrieved from the internet: <URL:http://www.calphad.com/iron-carbon.html>.

Khalifa, et al.: "Effect of Mo—Fe substitution on glass forming ability, thermal stability, and hardness of Fe—C—B—Mo—Cr—W bulk amorphous allows," Materials Science and Engineering, vol. 490, No. 1-2, Aug. 25, 2008, pp. 221-228.

Kumashiro et al., May 31, 1980, The vickers micro-hardness of nonstoichiometric niobium carbide and vanadium carbide single crystals up to 1500c, Journal of Materials Science, 15(5):1321-1324.

Kushner et al., 1992, Thermal Spray Coatings, in Blau (ed) ASM Handbook, vol. 18, Friction, Lubrication, and Wear Technolgoy, pp. 829-833.

Kutsova, Nov. 9, 2015, The Influence of alloying elements on structure formation, phase composition and properties of chromium-manganese iron in the cast state, Metallurgical and Mining Industry, 1084.

Li et al., Feb. 28, 2000, Temperature dependence of the hardness of single-phase cementite films prepared by an electron-shower PVD method, Journal of the Japan Institute of Metals and Materials, 64(2):134-140.

Liu et al., Jan. 14, 2000, Measurement of austenite-to-ferrite transformation temperature after multi-pass deformation of steels, Materials Science and Engineering A, 194(1):L15-L18.

Miracle, D.B.: The efficient cluster packing model—An atomic structural model for metallic glasses, Acta Materialia vol. 54, Issue 16, Sep. 2006, pp. 4317-4336.

Miyoshi et al., Apr. 25, 1965, High temperature hardness of Wc, Tic, TaC, NbC and their mixed carbides, Journal of the Japan Society of Powder and Powder Metalurgy, 12(2):78-84.

Ohmura, Dec. 2003, Evaluation of temper softening behavior of Fe—C binary martensitic steels by nanoindentation, Scripta Materialia, 49(12):1157-1162.

Senkov et al., Jun. 23, 2010, Refractory high-entropy alloys, Intermetallics, 18:1758-1765.

Teng: "Processing, Microstructures, and Properties of Aluminide-Strengthened Ferritic Steels," The University of Tennessee, Knoxville, Dec. 2011.

Tillack, et al.: "Selection of Nickel, Nickel-Copper, Nickel-Cromium, and Nickel-Chromium-Iron Allows". ASM Handbook, Welding, Brazing and Soldering, vol. 6,Dec. 1, 1993 (Dec. 1, 1993) pp. 586-592, XP008097120, p. 589.

Tucker , 2013, Introduction to Thermal Spray Technology, ASM Handbook, vol. 5A, pp. 3-9.

Wang et al., Jul. 2014, Effect of molybdenum, manganese and tungsten contents on the corrosion behavior and hardness of iron-based metallic glasses, Materials and Corrosion, 65(7):733-741.

Wank et al., 2007, Behavior of thermally sprayed wear protective coatings exposed to different abrasive wear conditions in comparison to hard chromium platings, 7 pp.

Wayne, 1985, Iron-rich low-coast superalloys, PhD dissertation, University of Connecticut, 184 pp.

Wikipedia, Refractory metals, https://en/wikipedia.org/wiki/Refractory_metals.

Yamamoto et al., 2014, Influence of Mo and W on high temperature hardness of M7C3 carbide in high chromium white cast iron, Materials Transactions, 55(4):684-689.

Yano et al., Apr. 2011, Modification of NIAI intermetallic coatings processed by PTA with chromium carbides, ASTM International Journal, 8(4):190-204.

Yoo et al., Jun. 2006, The effect of boron on the wear behavior of iron-based hardfacing alloys for nuclear power plants valves, Journal of Nuclear Materials, 352:90-96.

Zhu et al., 2017, Microstructure and sliding wear performance of Cr7C3-(Ni,Cr)3(Al,Cr) coating deposited from Cr7C3 in situ formed atomized powder, J. Therm Spray Tech, 26:254-264.

International Search Report and Written Opinion re PCT Application No. PCT/US2021/019170, mailed May 27, 2021.

Titanium-Boron (TiB) Phase Diagram [online], [retrieved on Jan. 27, 2015]. Retrieved from the internet: <URL:http://www.calphad.com/titaniumboron.html>.

Gunther et al., 2018, Influence of processing conditions on the degradation kinetics of fused tungsten carbides in hardfacing, International Journal of Refractory Metals & Hard Materials, 70:224-231.

* cited by examiner

5 µm

SPHEROIDAL TUNGSTEN CARBIDE PARTICLES

BACKGROUND

Field

The disclosure relates generally to tungsten carbide particles, and more particularly to textured spheroidal tungsten carbides, composites formed thereof, and methods of applying the composites.

Description of the Related Art

A metal matrix composite (MMC) refers to a composite material which includes particles that are embedded within a metallic matrix. A MMC generally includes a high-melting temperature metallic powder that is infiltrated with a single metal or more commonly an alloy having a lower melting temperature than the powder. MMCs have various applications, including mining equipment. The physical properties of MMCs can be engineered through component materials and manufacturing processes thereof.

SUMMARY

In one aspect, a high strength drill bit comprises a metal matrix composite (MMC) comprising fused tungsten carbide particles within a matrix, wherein the fused tungsten carbide particles have a spheroidal or substantially spherical shape and a surface that is textured to have a grain boundary area fraction of at least 5.0%.

In some embodiments, the matrix comprises copper or a copper alloy.

In some embodiments, the plurality of tungsten carbide particles have a grain boundary area fraction of at least 10.0%. In some embodiments, the plurality of tungsten carbide particles have a grain boundary area fraction of at least 12.0%. In some embodiments, the plurality of tungsten carbide particles have a grain boundary area fraction of at least 20.0%. The boundary area fraction can also have a value in a range defined by any of these values.

In some embodiments, the metal matrix composite has a Weibull modulus of 15 or greater. In some embodiments, the metal matrix composite has a Weibull modulus of 20 or greater. In some embodiments, the metal matrix composite has a Weibull modulus of 25 or greater. The Weibull modulus can also have a value in a range defined by any of these values.

In some embodiments, a linear extrapolation to a 1 in 10,000 probability of failure for the metal matrix composite equates to 80 ksi or greater. In some embodiments, a linear extrapolation to a 1 in 10,000 probability of failure for the metal matrix composite equates to 140 ksi or greater. In some embodiments, a linear extrapolation to a 1 in 10,000 probability of failure for the metal matrix composite equates to 180 ksi or greater. The linear extrapolation can also have a value in a range defined by any of these values.

In some embodiments, the metal matrix composite has a transverse rupture strength of at least 140 ksi. In some embodiments, the metal matrix composite has a transverse rupture strength of at least 450 ksi. In some embodiments, the metal matrix composite has a transverse rupture strength of at least 700 ksi. The transverse rupture strength can also have a value in a range defined by any of these values.

In some embodiments, the metal matrix composite has an erosive volume loss of 0.10 cm$^3$ or less. In some embodiments, the metal matrix composite has an erosive volume loss of 0.08 cm$^3$ or less. In some embodiments, the metal matrix composite has an erosive volume loss of 0.04 cm$^3$ or less. The erosive volume loss can also have a value in a range defined by any of these values.

In another aspect, a method of forming a metal matrix composite (MMC) comprises adding into a mold fused tungsten carbide particles having a spheroidal or substantially spherical shape and a surface that is textured to have a grain boundary area fraction greater than 5.0%. The method additionally comprises adding a binder material comprising copper into the mold. The method additionally comprises melting the binder material to infiltrate the fused tungsten carbide particles. The method further comprises solidifying the molten binder material to form the MMC.

In some embodiments, the method comprises forming the MMC as part of a high strength drill bit, wherein the method further comprises adding steel components into the mold, and wherein melting the binder material comprises at least partially encompassing the steel component.

In some embodiments, the plurality of tungsten carbide particles have a grain boundary area fraction of at least 10.0%. In some embodiments, the plurality of tungsten carbide particles have a grain boundary area fraction of at least 12.0%. In some embodiments, the plurality of tungsten carbide particles have a grain boundary area fraction of at least 20.0%. The grain boundary fraction can also have a value in a range defined by any of these values.

In some embodiments, the metal matrix composite has a Weibull modulus of 15 or greater. In some embodiments, the metal matrix composite has a Weibull modulus of 20 or greater. In some embodiments, the metal matrix composite has a Weibull modulus of 25 or greater. The Weibull modulus can also have a value in a range defined by any of these values.

In some embodiments, a linear extrapolation to a 1 in 10,000 probability of failure for the metal matrix composite equates to 80 ksi or greater. In some embodiments, a linear extrapolation to a 1 in 10,000 probability of failure for the metal matrix composite equates to 140 ksi or greater. In some embodiments, a linear extrapolation to a 1 in 10,000 probability of failure for the metal matrix composite equates to 180 ksi or greater. The linear extrapolation can also have a value in a range defined by any of these values.

In some embodiments, the metal matrix composite has a transverse rupture strength of at least 140 ksi. In some embodiments, the metal matrix composite has a transverse rupture strength of at least 450 ksi. In some embodiments, the metal matrix composite has a transverse rupture strength of at least 700 ksi. The transverse rupture strength can also have a value in a range defined by any of these values.

In some embodiments, the metal matrix composite has an erosive volume loss of 0.10 cm$^3$ or less. In some embodiments, the metal matrix composite has an erosive volume loss of 0.08 cm$^3$ or less. In some embodiments, the metal matrix composite has an erosive volume loss of 0.04 cm$^3$ or less. The erosive volume loss can also have a value in a range defined by any of these values.

In another aspect, a powder blend comprises fused tungsten carbide particles. The fused tungsten carbide particles have a spheroidal or substantially spherical shape having ratio of a first length along a major axis to second length along a minor axis that is 1.20 or lower. The fused tungsten carbide particles have a surface that is textured to have a grain boundary area fraction greater than 5.0%.

In some embodiments, the textured surface is defined by having a needle-like topography, wherein a grain boundary area fraction is greater than 5.0%.

In some embodiments, the powder blend is used in infiltration casting to form a high strength MMC. In some embodiments, the powder blend is used to form a high strength MMC that has a Weibull modulus of 15 or greater. In some embodiments, the powder blend is used to form a high strength MMC that has a linear extrapolation of the Weibull plot to a 1 in 10,000 probability of failure that equates to an applied stress of 80 ksi or greater. In some embodiments, the powder blend is used to form a high strength MMC that has an erosive volume loss of 0.10 cm³ or lower. In some embodiments, the powder blend is used to form a high strength MMC that has an ASTM 611 volume loss of 1.00 cm³ or lower.

In another aspect, a metal matrix composite (MMC) comprises fused tungsten carbide particles having a spheroidal or substantially spherical shape and a surface that is textured to have a grain boundary area fraction greater than 5.0%. The MMC additionally comprises a matrix having embedded therein the fused tungsten carbide particles.

In some embodiments, the MMC is formed by infiltration of the tungsten carbide particles using a liquid metal formed of a metal or a metal alloy, e.g., copper or a copper alloy, wherein the metal matrix composite exhibits high strength.

In some embodiments, the metal matrix composite has a Weibull modulus of 15 or greater. In some embodiments, a linear extrapolation of the Weibull plot to a 1 in 10,000 probability of failure equates to an applied stress of 80 ksi or greater. In some embodiments, the metal matrix composite has an erosive volume loss of 0.10 cm³ or lower. In some embodiments, the metal matrix composite has an ASTM 611 volume loss of 1.00 cm³ or lower.

In some embodiments, the metal matrix composite has the textured tungsten particles having a D50 between 1 μm and 10 μm and the MMC has a transverse rupture strength of 360 ksi or greater. In some embodiments, the textured tungsten carbide particles have a D50 between 11 μm and 20 μm and the MMC has a transverse rupture strength of 280 ksi or greater. In some embodiments, the textured tungsten carbide particles have a D50 between 21 μm and 40 μm and the MMC has a transverse rupture strength of 230 ksi or greater. In some embodiments, the textured tungsten carbide particles have a D50 between 41 μm and 60 μm and the MMC has a transverse rupture strength of 180 ksi or greater. In some embodiments, the textured tungsten carbides have a D50 between 61 μm and 80 μm and the MMC has a transverse rupture strength of 160 ksi or greater. In some embodiments, the textured tungsten carbides have a D50 between 81 μm and 100 μm and the MMC has a transverse rupture strength of 140 ksi or greater. In some embodiments, the textured tungsten carbide particles have a D50 between 101 μm and 200 μm and the MMC has a transverse rupture strength of 100 ksi or greater. The D50 and the transverse rupture strength can have a value in a range defined by any of these values.

In some embodiments, the metal matrix composite is used to form a drill bit containing a plurality of cutting elements and contained within its construction is a metal matrix composite.

Further disclosed herein are embodiments of a drill bit formed from the disclosure.

DETAILED DESCRIPTION

Figure 1:
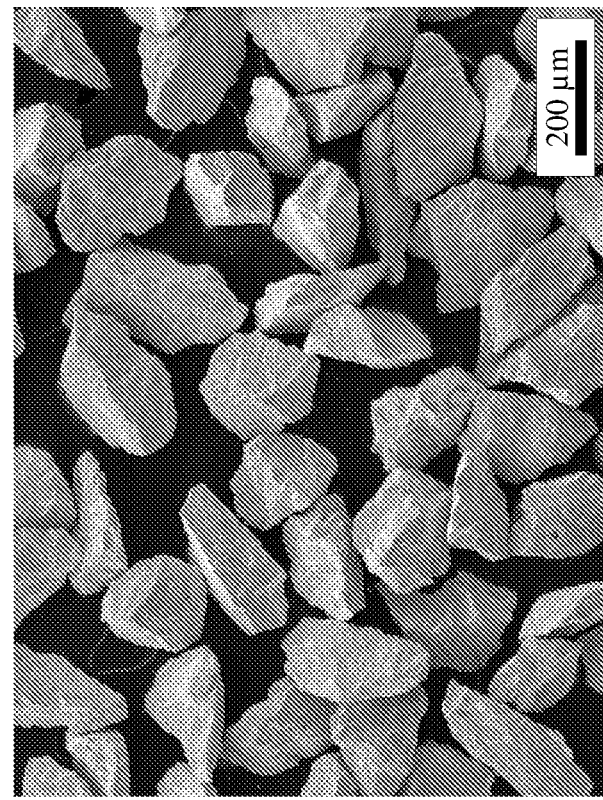
FIG. 1 illustrates a scanning electron microscopy (SEM) image of a prior art metal powder with angular particles.

Disclosed herein are embodiments of spheroidal or substantially spherical fused tungsten carbide particles, and metal matrix composites (MMCs) formed from the tungsten carbide particles. The MMCs can include a matrix comprising copper and/or copper alloys, along with the tungsten carbide particles. The tungsten particles as well as MMCs formed therefrom according to embodiments can have substantially improved properties over conventional angular fused tungsten carbide particles as well as MMCs formed therefrom. In particular, embodiments of the disclosure can be used to improve erosion resistance and impact resistance of resulting metal matrix composite (MMC).

The spheroidal or substantially spherical fused tungsten carbide particles can generally be made from regular fused tungsten carbide powder or a mixture of tungsten, mono tungsten carbide and/or carbon. In some embodiments, the spheroidal or substantially spherical fused tungsten carbide particles can have a composition of combined carbon from 3.7 to 4.2 (or about 3.7 to 4.2) wt. %, with tungsten being the balance. The particles can be produced via a number of methods. In some methods, a mixture of tungsten powder blended with mono tungsten carbide and carbon powder is melted first. The molten mixture is then atomized by a rotation atomizing process or an ultra-high temperature melting & atomizing process. These processes spheroidizes molten tungsten carbide into spheroidal or substantially spherical fused tungsten carbide particles during the rapid solidification process due to surface tension. Other methods may be based on the modification of regular fused tungsten carbide powder. Plasma spraying, electric induction or electric resistance furnace melting is applied during the spheroidization process to obtain fine spheroidal or substantially spherical fused tungsten carbide particles.

As described herein, "sphericity" can be defined by an aspect ratio of the spheroidal or substantially spherical particles. The aspect ratio can be a ratio of a first length along a major axis to a second length along a minor axis, or a ratio of the longest axis length to the shortest axis length, of the spheroidal or substantially spherical particles. For example, a "perfectly" spherical particle would have an aspect ratio of exactly one. On the other hand, "angular" particles, such as discussed above in the art, have an aspect ratio of at least 1.30.

In embodiments of the disclosure, spheroidal or substantially spherical fused tungsten carbide particles disclosed herein can have an aspect ratio of 1.20 (or about 1.20) or lower. In some embodiments, a spherical fused tungsten carbide can have an aspect ratio of 1.10 (or about 1.10) or lower. In some embodiments, a spherical fused tungsten carbide can have an aspect ratio of 1.05 (or about 1.05) or lower. The aspect ratio can also have a value in a range defined by any of these values. The aspect ratio as disclosed herein can represent an average value of aspect ratios of a plurality of fused tungsten carbide particles. In some embodiments, each of the particles can have an aspect ratio as disclosed herein.

The spheroidal or substantially spherical fused tungsten carbide powder specific density can be around 16.5 g/cm³ with micro-hardness advantageously ranging from 2,700-3,300 HV (or about 2,700-about 3,300 HV). These properties can be attributed to, among other things, the particle shape and internal microstructure resulting from the spheroidization processes described above. In comparison, a mostly angular fused tungsten carbide exhibits a substantially inferior hardness of about 1,500-2,200 HV only. Generally, MMCs containing spheroidal or substantially spherical fused tungsten carbide particles are more wear resistant than those that contain angular fused tungsten carbide for particles having a comparable size and fraction. In the following, various microstructural distinctions between conventional angular tungsten carbide particles and MMCs formed therefrom, and spheroidal or substantially spherical tungsten carbide particles and MMCs formed therefrom according to embodiments, are described.

FIG. 1 shows a scanning electron microscope (SEM) image of a prior art metal powder. As shown, the prior art metal powder is angular.

Figure 2:
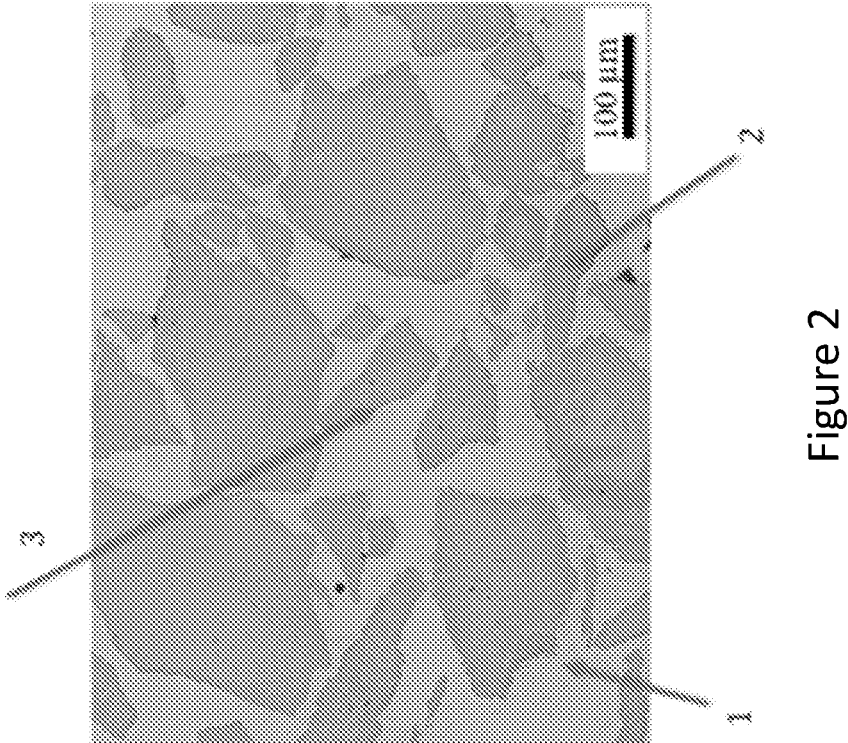
FIG. 2 illustrates an optical micrograph of a prior art metal matrix composite (MMC) prepared using angular particles.

FIG. 2 illustrates an optical micrograph of a prior art MMC prepared using metallographic techniques. As shown, the MMC includes a soft phase 1, a particulate phase 2 formed from a powder similar to that shown in FIG. 1, and a particulate-to-soft phase interface 3. Soft phase can be formed a matrix material that is first melted and subsequently cooled. Thus, the prior art MMC includes two principle phases. The soft phase 1 is formed through the liquid metal infiltration of the particulate phase 2.

The particulate phase 2 can include metal carbides, borides or oxides. For example, the particular phase 2 can include tungsten carbides including: mono tungsten carbide, fused tungsten carbide or cemented tungsten carbide. Typically, the tungsten carbide particles are angular, as shown in FIG. 1. Between the soft phase 1 and the particulate phase 2 there is an interface 3. As described herein, the inventors have discovered that all three can contribute to the strength and wear properties of the MMC.

Figure 3:
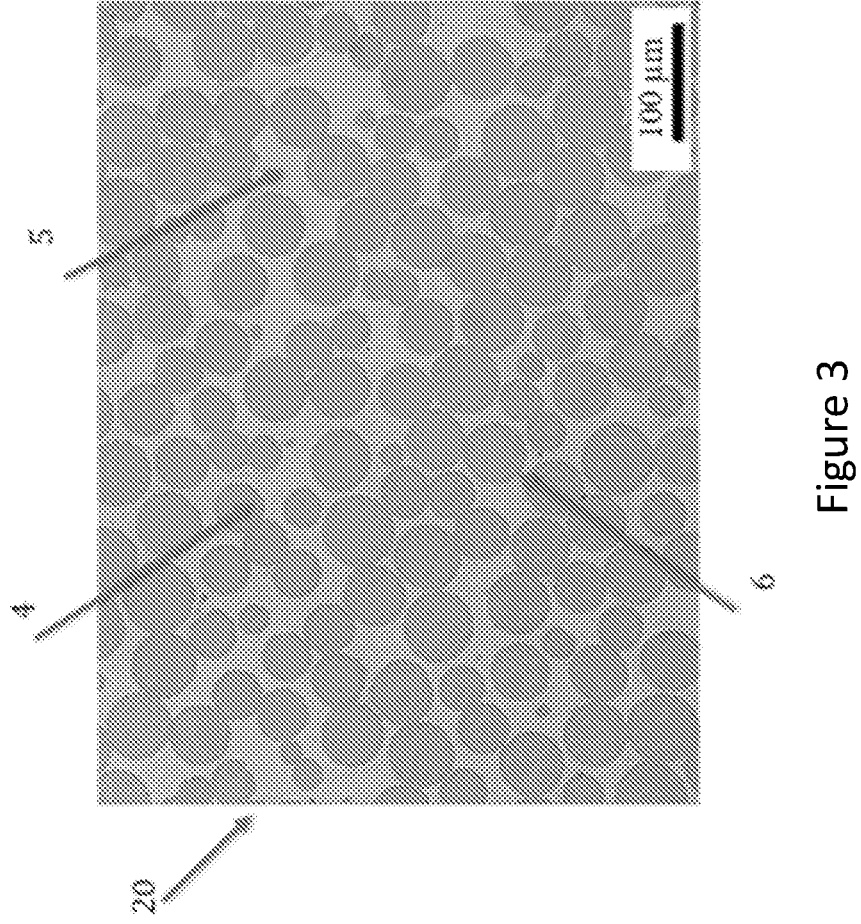
FIG. 3 illustrates an optimal micrograph of a MMC prepared using spheroidal or substantially spherical particles.

FIG. 3 illustrates an optical micrograph of a metal matrix composite (MMC) 20 prepared using spheroidal or substantially spherical carbide particles according to embodiments. As shown, the MMC 20 includes spheroidal or substantially spherical fused tungsten carbide particles 4 and a soft phase 5, which are combined to form the metal matrix composite (MMC) 20. The MMC 20 additionally includes a spheroidal or substantially spherical fused tungsten carbide-to-soft phase interface 6.

The interface 6 includes metallic or metallurgical bonds formed between the tungsten carbide particles 4 and the soft phase 5. It will be appreciated that the metallurgical bonds disclosed herein may comprise diffused atoms and/or atomic interactions, and may include chemical bonds formed between atoms of the particles 4 and the atoms of the soft phase. A metallurgical bond is more than a mere mechanical bond. Under such conditions, the component parts may be "wetted" to and by the metallic binding material.

Before being incorporated into the MMC, a mixture including the spheroidal or substantially spherical tungsten carbide particles is in the form of a powder. The MMC formed from the spheroidal or substantially spherical particles discussed herein may be called spherical MMC, whereas the prior art MMC formed from angular powder may be called angular MMC.

In some embodiments, a liquid metal infiltration route can be used to form the MMC. For example, a metallic binding material may, for example, be generally any suitable brazing metal, including copper, chromium, tin, silver, cobalt nickel, cadmium, manganese, zinc and cobalt or an alloy thereof. The metallic binding material can be liquid cast through tungsten carbide powder and solidified to form the MMC.

Figure 4:
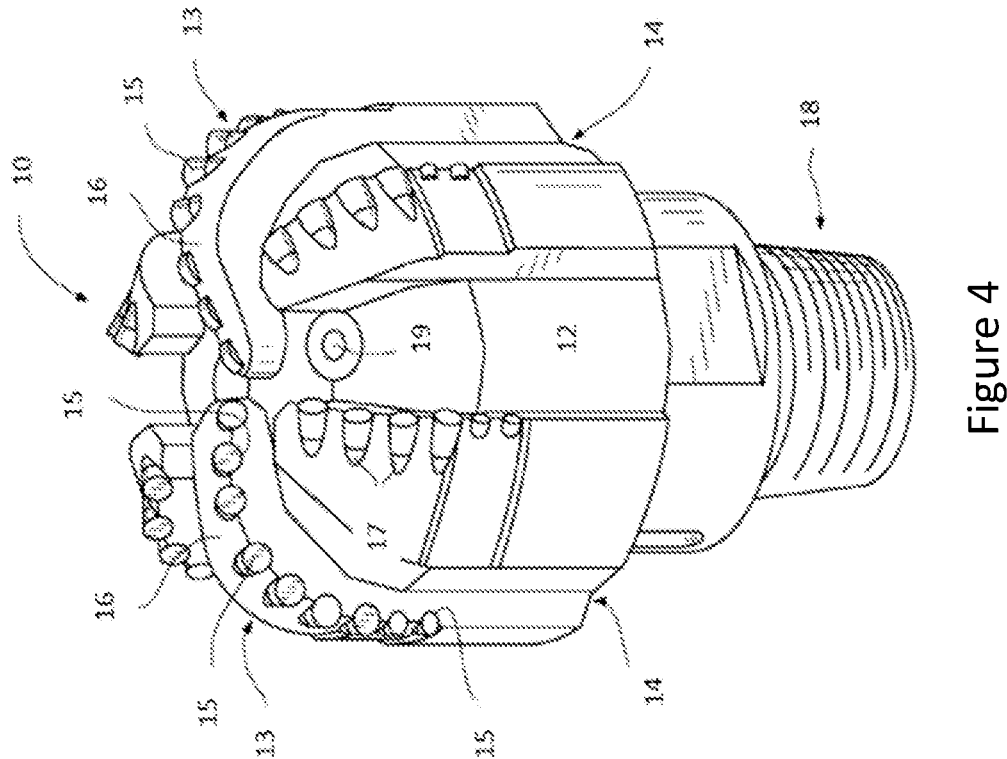
FIG. 4 shows a perspective view of an embodiment of earth-engaging tool with a drill bit.
Figure 12:
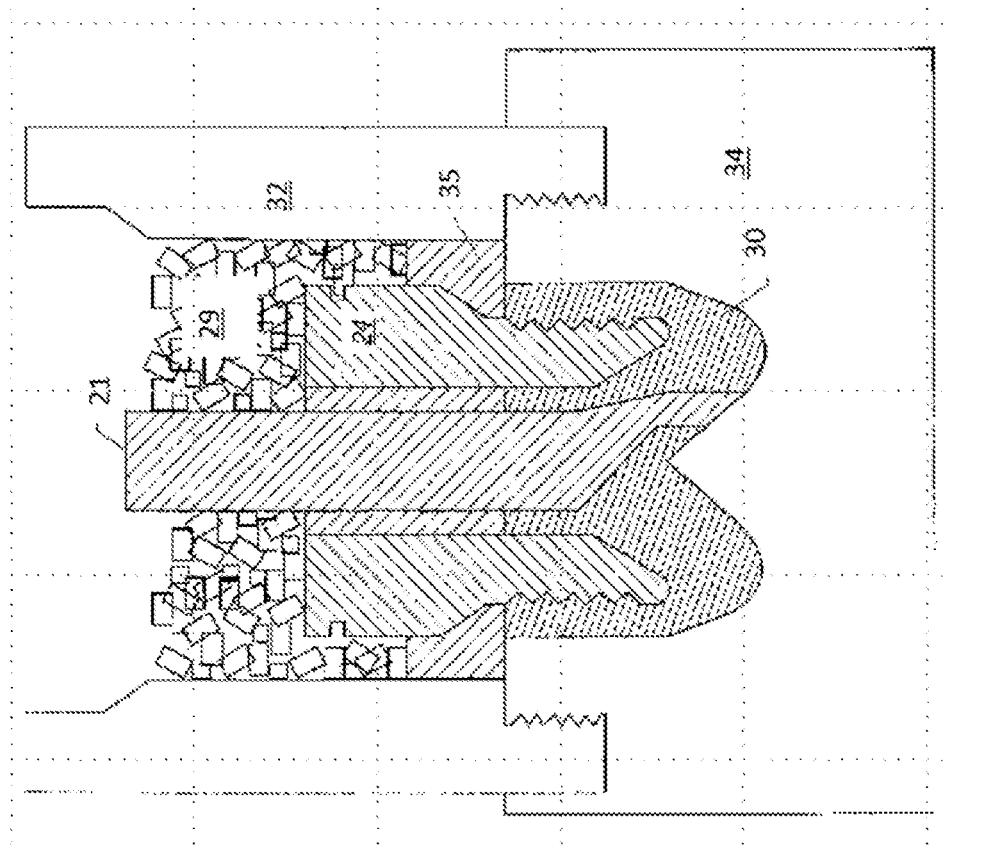
FIG. 12 illustrates a mold geometry for liquid metal infiltration of powder to create a drill-bit body.

Specifically, liquid metal infiltration of powder containing the components described herein is described with reference to FIG. 12. A graphite mold assembly 32, 34 is produced that reflects a negative of the desired shape of a drill bit 10 (FIG. 4). A powder 30 comprising the spheroidal or substantially spherical particles is poured and compacted in the mold assembly. Subsequently, a binder 29, e.g., copper or copper alloy binder, and steel parts 24 may be added. Thus configured mold assembly is heated to melt at least the binder 29. Within the mold is a sand component 21 whose function is to define regions within the resulting casting that is free from MMC. Upon melting, the binder 29 infiltrates the powder 30 and creates bonds to the steel parts 24. Upon cooling, the solidified structure contains a plurality of composites advantageously located for strength and wear considerations.

In some embodiments, a quaternary material system may be used as the binder 29. In some embodiments, the binding material can be a quaternary system comprising copper (47-58 wt. % or about 47-about 58), manganese (23-25 wt. % or about 23-about 25), nickel (14-16 wt. % or about 14-about 16) and zinc (7-9 wt. % or about 7-about 9). This composition can provide for an advantageous combination of properties for liquid metal infiltration and the resulting mechanical properties of the MMC. However, other compositions can be used as well and the composition is not limiting.

Drill Bits

The inventors have discovered that the tungsten carbide particles and MMCs formed therefrom according to embodiments of the disclosure can be particularly useful for applying onto mining equipment, such as drills as described herein. However, it will be understood that embodiments are not so limited, and the tungsten carbide particles and MMCs formed therefrom can be used in a variety of other applications in which abrasion resistant materials are employed.

Earth-engaging drill bits are used extensively in industries including the mining, oil and gas industries for exploration and retrieval of minerals and hydrocarbon resources. Examples of earth-engaging drill bits include polycrystalline diamond compact (PDC) bits.

A drill bit wears when it rubs against either of a formation or a metal casing tube. The wear may lead to the loss of function and failure of the drill bit. A cooling and lubricating drilling fluid are generally circulated through the drill bit using high hydraulic energies. The drilling fluid may contain abrasive particles, for example sand, which when impelled by the high hydraulic energies can exacerbate wear at the face of the drill bit and elsewhere.

Drill bits may have a body comprising at least one of hardened and tempered steel, and a metal matrix composite (MMC). A steel drill bit body may have increased ductility and may be favorable for manufacture. A steel drill bit body may be manufactured using casting and wrought manufacturing techniques, examples of which include but not limited to forging or rolled bar techniques. The steel properties after heat treatment are consistent and repeatable. Fracture of steel-bodied drill bits is infrequent; however, a worn steel drill bit body may be difficult for an operator to repair.

A MMC drill bit body may wear more slowly than a steel drill bit body. An MMC drill bit body known in the art, however, more frequently fractures during casting and/or processing and/or use from thermal and mechanical shock. Fracturing may cause an early removal of a drill bit from service because it may be structurally unsound or have cosmetic defects. Alternatively, the MMC drill bit body of the prior art may fail catastrophically with the loss of part of the cutting structure, which may result in sub-optimal drilling performance and early retrieval of the drill bit.

In many cases, it is a wing or blade of a drill bit that fractures. Wing or blade failures are economically damaging for drill bit manufacturers. The retrieval of a worn or failed drill bit from a drilled hole, for example a well or borehole, is undesirable. The non-productive time required to retrieve and introduce into the drilled hole a replacement drill bit may cost millions of dollars. Drill bits and other earth-engaging tools with increased wear resistance and lower rates of failure may save considerable time and money. Therefore, developing an ultra-high-strength MMC for drill bits is desirable to reduce or prevent fracture during drilling.

The strength of a sample of an MMC may be determined using a transverse rupture strength (TRS) test, where a load is centrally applied to the cubic or cylindrically shaped MMC sample that is supported between two points. A plurality of samples may be tested to derive a mean strength and a standard deviation which are then taken as being representative. The reliability analysis of the TRS of MMC can provide additional information such as the failure possibility under different stress.

While MMC drill bits can generally perform better in erosion than steel bits, they still may encounter rapid deceleration of particles in hydraulic fluids, resulting in the erosive removal of material. The high-velocity drilling-mud exits nozzles with the intention of cooling the bit and evacuating the detritus. Drilling mud contains materials such as bentonite, clay and surfactants, which also contains hard and angular minerals from the rock material removal process. The contact between the PDC bits and drilling mud may also degrade the drill bits by erosion. Therefore, the MMC disclosed herein has high erosion resistance accompanied with ultrahigh strength to improve the reliability and performance of the drill bits during the drilling.

FIG. 4 shows a perspective view of an embodiment of earth-engaging tool in the form of a drill bit 10 which comprises a bit body 12 comprising an MMC 20 (FIG. 3) according to embodiments disclosed herein. Some, or all, of the bit body 12 may be formed from embodiments of the MMC 20. In some embodiments, a majority of the bit body 12 is formed from embodiments of the MMC 20. Further, the tool can include a nozzle port 19, e.g., for hydraulic fluid, a blade 16 that supports cutting elements, cutting elements 15, such as polycrystalline diamond compact (PDC) cutter, and junk slots 14 for carrying cuttings away in a fluid from a face of the bit.

The MMC 20 can be formed from a mixture, which comprises a plurality of mostly spheroidal or substantially spherical particles.

Structural features of the drill bit 10, will now be described, by way of example. It will be appreciated, however, that other embodiments of a tool may have some or none of the described structural features, or may have other structural features. The bit body 12 can have protrusions in the form of radially projecting and longitudinally extending wings or blades 13, which are separated by channels at the face 16 of the drill bit 10 and junk slots 14 at the sides of the drill bit 10. A plurality of cemented tungsten carbide or PDC cutters 15 are brazed within pockets on the leading faces of the blades 13 extending over the face 16 of the bit body 12. The PDC cutters 15 may be supported from behind by buttresses 17, for example, which may be integrally formed with the bit body 12.

The drill bit 10 may further include a shank 18 in the form of an API threaded connection portion for attaching the drill bit 10 to a drill string (not shown). Furthermore, a longitudinal bore (not shown) extends longitudinally through at least a portion of the bit body 12, and internal fluid passageways (not shown) provide fluid communication between the longitudinal bore and nozzles 19 provided at the face 16 of the bit body 12 and opening onto the channels leading to junk slots 14 for removing the drilling fluid and formation cuttings from the drill face.

During formation cutting, the drill bit 10 is positioned at the bottom of a hole and rotated while weight-on-bit is applied. A drilling fluid—for example a drilling mud delivered by the drill string to which the drill bit is attached—is pumped through the bore, the internal fluid passageways, and the nozzles 19 to the face of the bit body and PDC cutters 15. As the drill bit 10 is rotated, the PDC cutters 15 scrape across, and shear away, the underlying earth formation. The formation cuttings mix with, and are suspended within, the drilling fluid and pass through the junk slots 14 and up through an annular space between the wall of the hole (in the form of a well or borehole, for example), and the outer surface of the drill string to the surface of the earth formation.

Physical Properties

While the strength of a sample of an MMC may be determined using a TRS test, the failure to take a statistical approach of the TRS data may not:

1. indicate the likelihood of failure;

2. access the probability of failure at a given stress value; and/or 3. allow measurement of changes or improvements to powder compositions and the MMCs made with the powders, in particular the relationship between stress and reliability.

The strength distribution in a population of samples of the MMC used in the earth-engaging and other tools may be determined using Weibull statistics, which is a probabilistic approach that enables a likelihood of failure to be established at a given applied stress. Embodiments of the disclosed MMCs may be used with an earth-engaging tool 10, for example, which are generally faithful to a Weibull distribution.

A Weibull strength distribution is described by:

$$F = 1 - \exp\left[-V\left(\frac{\sigma - \sigma_u}{\sigma_0}\right)^m\right]$$

The variables in the equation are: F is the probability of failure for a sample; $\sigma$ is the applied stress; $\sigma_u$ is the lower limit stress needed to cause failure, which is often assumed to be zero; $\sigma_0$ is the characteristic strength; m is the Weibull modulus, a measure of the variability of the strength of the material; V is volume of specimen.

The above equation is typically rearranged and presented on a double logarithmic plot of $(1/(1-F))$ versus logarithm of a and the slope used to calculate m, assuming $\sigma_u$ is zero.

Figure 5:
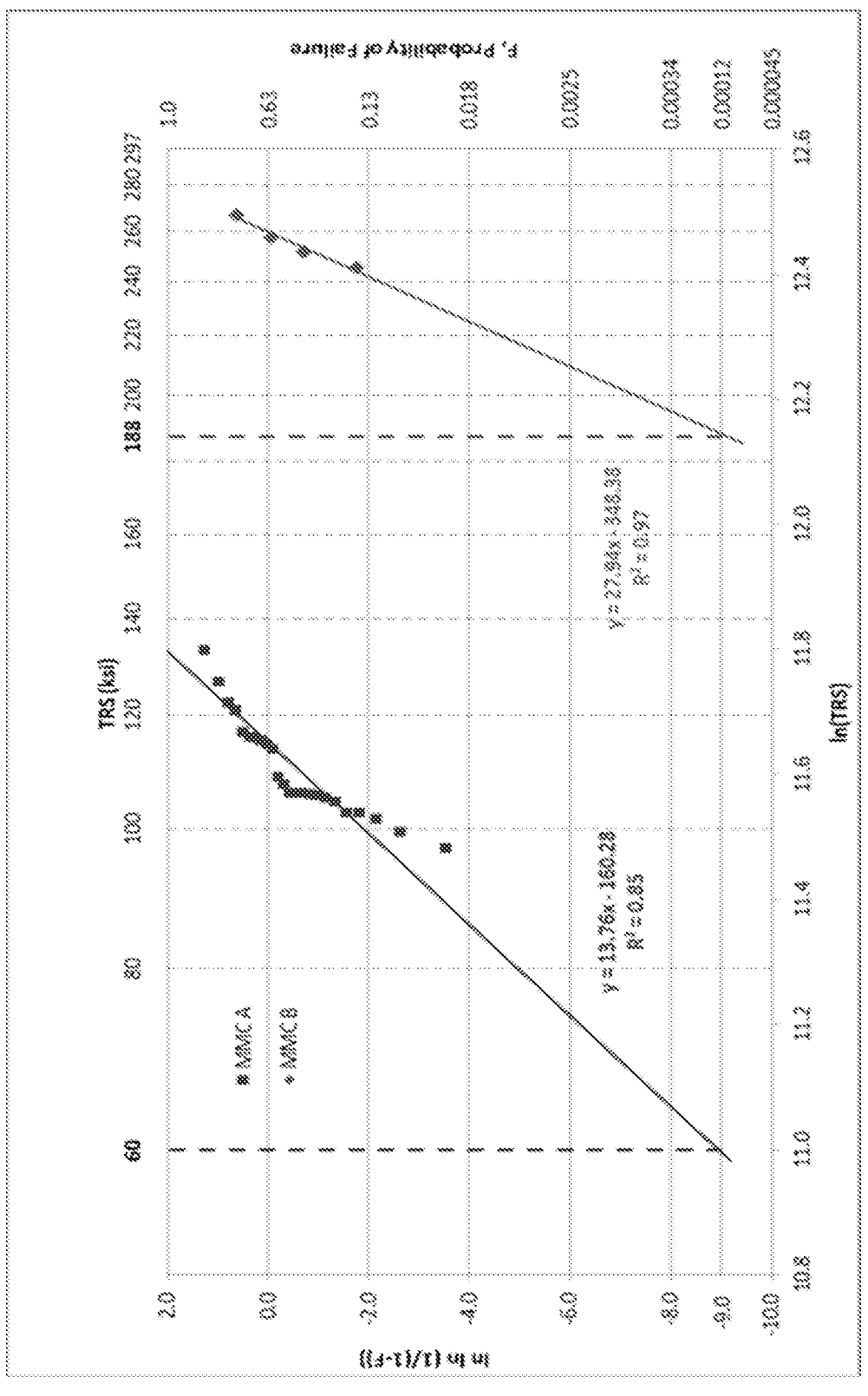
FIG. 5 illustrates strength and reliability improvement of embodiments of the disclosed ultra-high-strength MMC (right) and conventional MMC (left).

FIG. 5 shows a Weibull plot of empirical strength data for a plurality of samples of the same type of angular MMC similar to those shown in FIG. 2, containing predominately angular particles (MMC A, left) and an MMC containing predominately spheroidal or substantially spherical particles similar to those shown in FIG. 3 (MMC B, right) according to embodiments. The MMCs illustrated in FIG. 5 are composed of textured spheroidal or substantially spherical tungsten carbide and a Cu53 copper binder. The left-hand axis values are indicative of a function of the probability of failure, the right-hand values are indicative of a percentage probability of failure, and the bottom axis values are indicative of a function of the applied stress at the time of failure during a TRS test. The empirical strength data for the samples of angular MMC and the sample of spherical MMC follow a Weibull distribution. The slope of each line defines the respective Weibull moduli. The angular MMC has a Weibull modulus of 13.76 and the spherical MMC has a Weibull modulus of 27.94. The Weibull modulus is one measure of material strength variability. For example, for a Weibull modulus of 4, there will be a 30% variation (one standard variation) in strength.

In some embodiments, the spherical MMC has a Weibull modulus of 15 (or about 15) or greater. In some embodiments, the spherical MMC has a Weibull modulus of 20 (or about 20) or greater. In some embodiments, the spherical MMC has a Weibull modulus of 25 (or about 25) or greater. The Weibull modulus can also have a value in range defined by any of these values.

A Weibull plot can be used to design drill bit body blade heights and widths to a predetermined failure rate, and particularly how thin and tall the drill bit body blades can be for the predetermined failure rate. A taller and thinner blade may remove a formation faster than a shorter wider blade. However, it may have an unacceptable probability of failure. Alternatively, the reliability of a drill bit comprising angular MMC can be compared the reliability of another identically configured drill bit comprising spherical MMC.

Linear extrapolation to a 1 in 10,000 probability of failure equates to applied stress of about 60 ksi (kilopound per square inch) and 188 ksi for angular MMC and spherical MMC, respectively.

In some embodiments of this disclosure, the linear extrapolation to a 1 in 10,000 probability of failure for the spherical MMC equates to 80 (or about 80) ksi or greater. In some embodiments of this disclosure, the linear extrapolation to a 1 in 10,000 probability of failure for the spherical MMC equates to 100 (or about 100) ksi or greater. In some embodiments of this disclosure, the linear extrapolation to a 1 in 10,000 probability of failure for the spherical MMC equates to 120 (or about 120) ksi or greater. In some embodiments of this disclosure, the linear extrapolation to a 1 in 10,000 probability of failure for the spherical MMC equates to 140 (or about 140) ksi or greater. In some embodiments of this disclosure, the linear extrapolation to a 1 in 10,000 probability of failure for the spherical MMC equates to 160 (or about 160) ksi or greater. In some embodiments of this disclosure, the linear extrapolation to a 1 in 10,000 probability of failure for the spherical MMC equates to 180 (or about 180) ksi or greater. The linear extrapolation to a 1 in 10,000 probability of failure may have a value in a range defined by any of these values.

Microstructure

In this disclosure, the surface topography of spheroidal or substantially spherical fused tungsten particles that form a powder was examined in detail. The surface condition of the novel spheroidal or substantially spherical fused tungsten carbide has a textured surface. The inventors have discovered that this texture can increase the available surface area at the interface 6 between the soft phase 5 and the spheroidal or substantially spherical fused tungsten carbide particles 4, as shown in FIG. 3.

Figure 6:
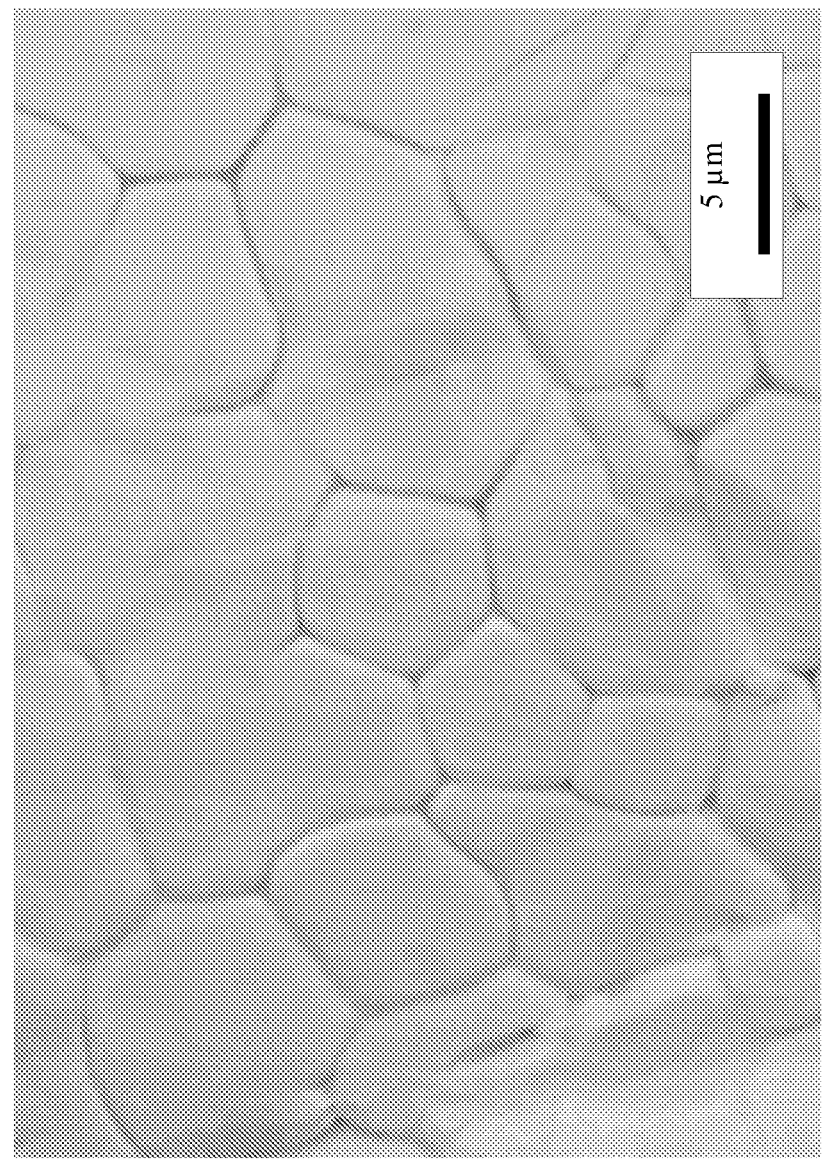
FIG. 6 illustrates an SEM image of a prior art MMC.

FIG. 6 illustrates the surface morphology of a tungsten particle in a conventional MMC. As shown, the microstructure has "soccer-ball-like" topographical features of conventional fused tungsten carbide particles. The surface is relatively smooth, resulting in a low surface area and relatively low interfacial strength when incorporated within a MMC.

The strength of an MMC system can be associated with one or more of three different components: 1) the strength of the copper binder, the strength of the tungsten carbide particles, and the binding strength between the copper binder and the incorporated tungsten carbide particles. Thus, if the tungsten carbide particles and copper do not bond well, a failure can occur when the MMC undergoes high stress. By having carbide particles with larger surface area, the alloy has more area to bond to the carbide particles, thus increasing the interfacial strength.

Figure 7:
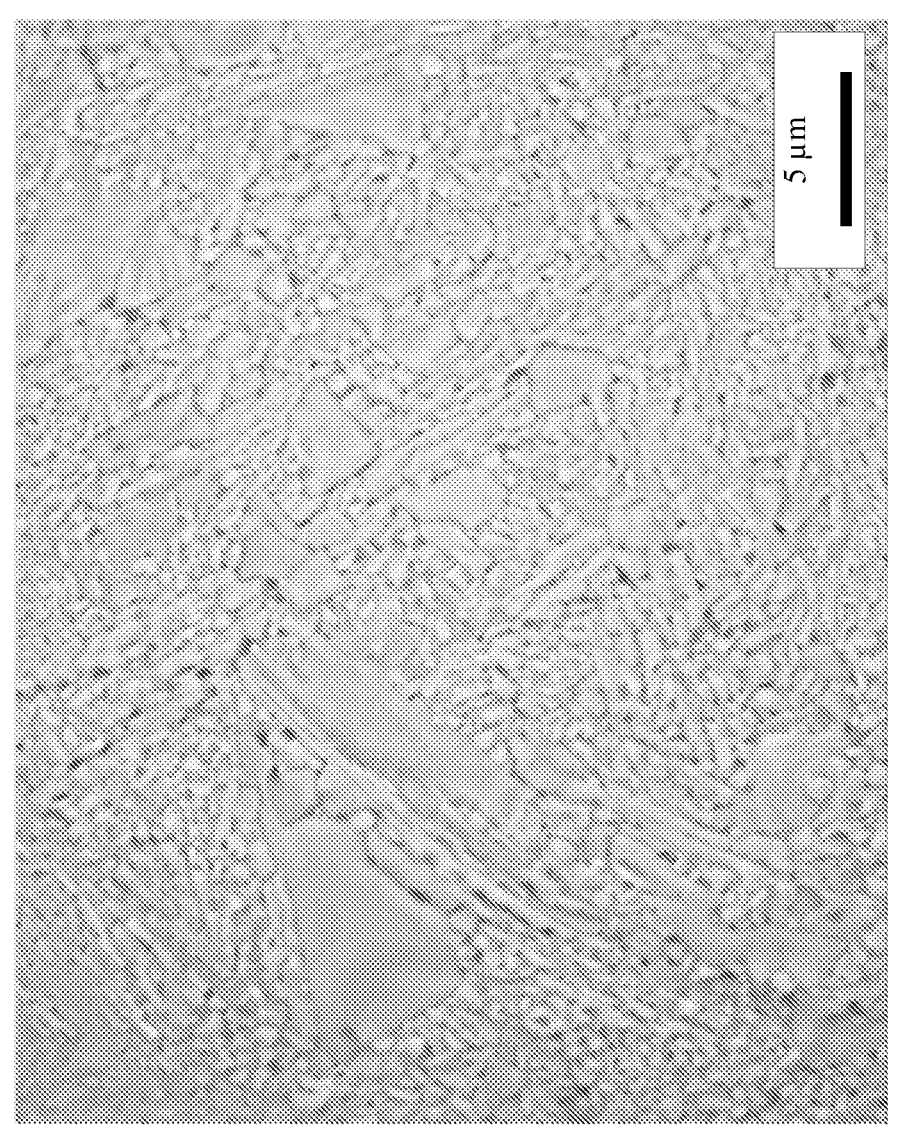
FIGS. 7-8 illustrate an SEM image of an MMC according to the disclosure.

FIG. 7 illustrates the surface morphology of a spheroidal or substantially spherical tungsten particle in an MMC according to embodiments of this disclosure. As shown, the microstructure includes a "needle-like" topographical features (e.g., the texturing) of spheroidal or substantially spherical fused tungsten carbide. The surface is mostly textured with a fine-grained structure, resulting in a high surface area and better interfacial strength when incorporated within a MMC.

Figure 8:
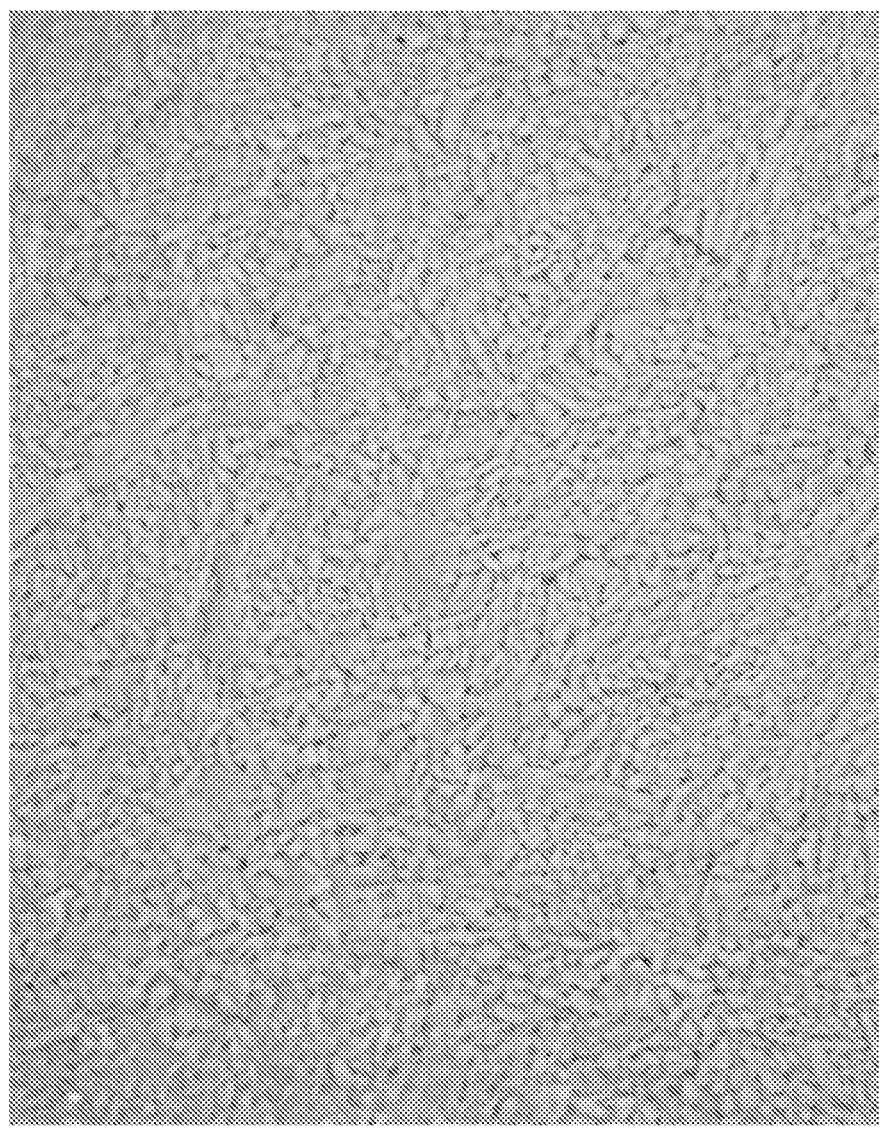

FIG. 8 illustrates the surface morphology of a spheroidal or substantially spherical tungsten particle in an MMC according to embodiments of this disclosure. As shown, the microstructure includes dense "needle-like" like topographical features of spheroidal or substantially spherical fused tungsten carbide. The surface is mostly textured with a finer grained structure resulting in an even higher surface area and exceptional interfacial strength when incorporated within a MMC.

In order to quantify the spheroidal or substantially spherical fused tungsten carbide particles by their surface features, the fraction of a surface area in a fixed view field of an optical or SEM image that can be attributed to grain boundaries is analyzed. As described herein, an area fraction of grain boundary refers to the area in an image, e.g., an optical or SEM image, of a surface of a sample, e.g., the surface of a tungsten carbide particle, that can be attributed to grain boundaries. The area fraction of grain boundary can be quantified using images, e.g., high contrast or binary images such as those shown in FIGS. 9-11. For example, the number of dark pixels as a fraction of a total number of pixels within an imaged field can correspond the area fraction of grain boundary. The inventors have discovered that the conventional "soccer-ball-like" surface morphology of tungsten carbide particles leads to a relatively low area fraction of grain boundary on the surface of the tungsten carbide particles, e.g., less than 5%. On the contrary, the "needle-like" surface morphology of tungsten particles according to embodiments leads to a relatively high area fraction of grain boundary on the surface of the tungsten carbide particles, e.g., over 10% (or about 10%). For example, the area fraction of the grain boundary in FIG. 6 is 3.6% while the value in FIG. 7 is 14.2%. For an even better case, the area fraction of the grain boundary in FIG. 8 is as high as 20.1% showing the more uniform and finer grains overall.

The inventors have discovered that the combination of the spheroidal shape of the tungsten carbide particles, and the needle-like surface morphology thereof, gives rise to the relatively high surface area of the tungsten particle carbide particles, which in turn gives rise to the relatively high grain boundary area fraction. The high grain boundary area fraction can be proportional to the amount of high strength interfaces formed between the tungsten carbide particles and the metal matrix, and can in turn be proportional to the mechanical and tribological properties of the MMCs, including the TRS and the erosion resistance. According to embodiments, in addition, the needle-like topography comprises needle-like structures that are elongated along surfaces of the tungsten carbide particles. The needle-like structures have at least a portion length portion having a length exceeding, e.g., 0.5, 1, 2, 3, 4, 5 μm, or a value in a range defined by any of these values, while having a width that is less than 2, 1, 0.5, 0.2, 0.1 μm, or a value in a range defined by any of these values. The needle-like structures may have a ratio of the longest length to the smallest width that exceeds 2, 5, 10, 20 or a value in a range defined by any of these values.

In some embodiments of this disclosure, the spheroidal or substantially spherical fused tungsten carbide particles have a grain boundary area fraction of 5.0% (or about 5.0%) or greater. some embodiments of this disclosure, the spheroidal or substantially spherical fused tungsten carbide particles have a grain boundary area fraction of 10.0% (or about 10.0%) or greater. In some embodiments of this disclosure, the spheroidal or substantially spherical fused tungsten carbide particles have a grain boundary area fraction of 12.0% (or about 12.0%) or greater. In some embodiments of this disclosure, the spheroidal or substantially spherical fused tungsten carbide particle have a grain boundary area fraction of 12.0% (or about 12.0%) or greater. In some embodiments of this disclosure, the spheroidal or substantially spherical fused tungsten carbide particle have a grain boundary area fraction of 20.0% (or about 20.0%) or greater. The grain boundary area fraction can also have a value in a range defined by any of these values.

Homogeneity of the grain boundary distribution in the particle surface was also characterized. The original microstructure image was equally separated into nine parts. The grain boundary area fraction in each separated part was measured individually. Then the variation of the grain boundary area fraction for the nine separated parts were calculated. The lower the value of variance, the more uniform the distribution of the grain boundary. This lower variation can provide for improved strength to the MMC. For example, the variation in FIG. 8 (3.8) is lower than that in FIG. 7 (9.4), indicating a more uniform distribution of grain boundaries in FIG. 8.

Figure 9:
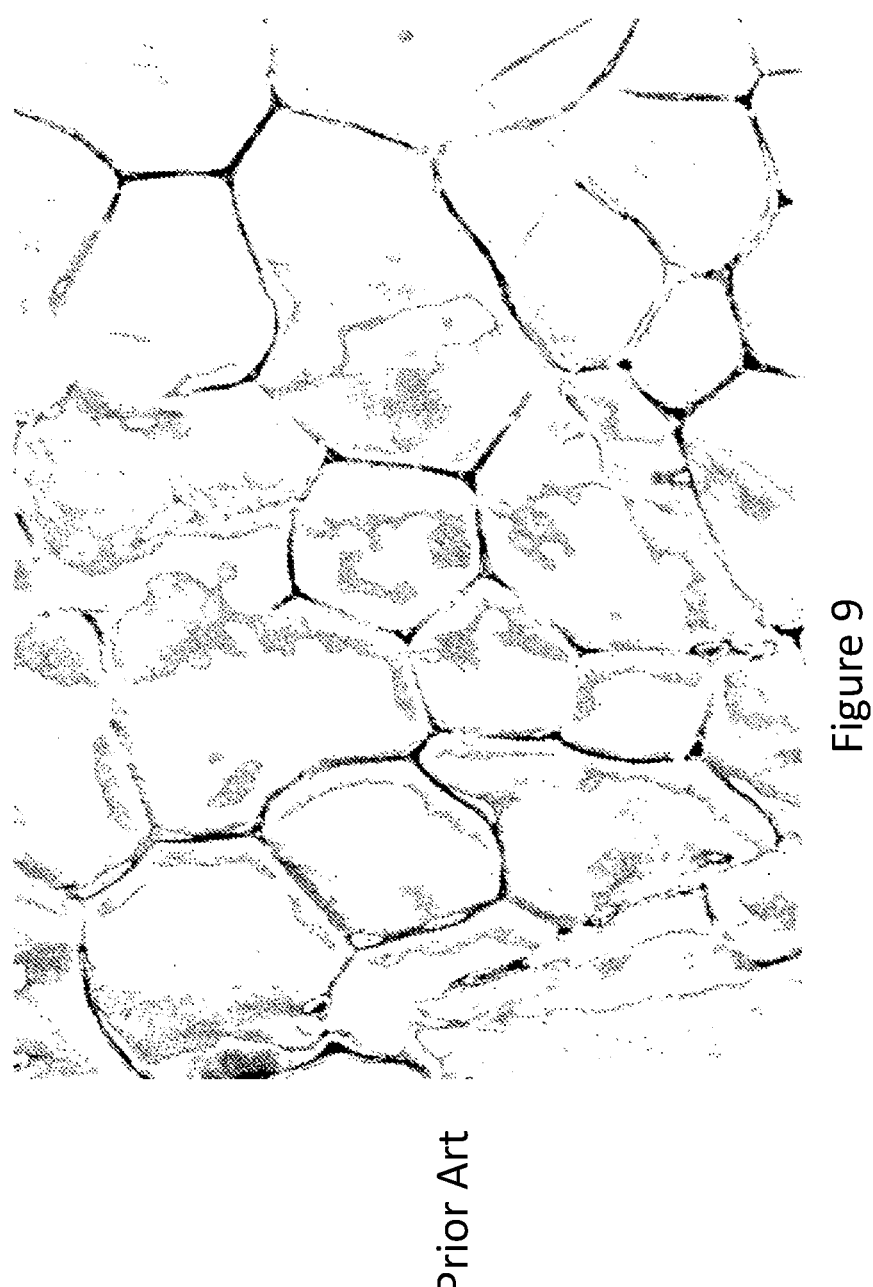
FIG. 9 illustrates a binary image of FIG. 6.
Figure 10:
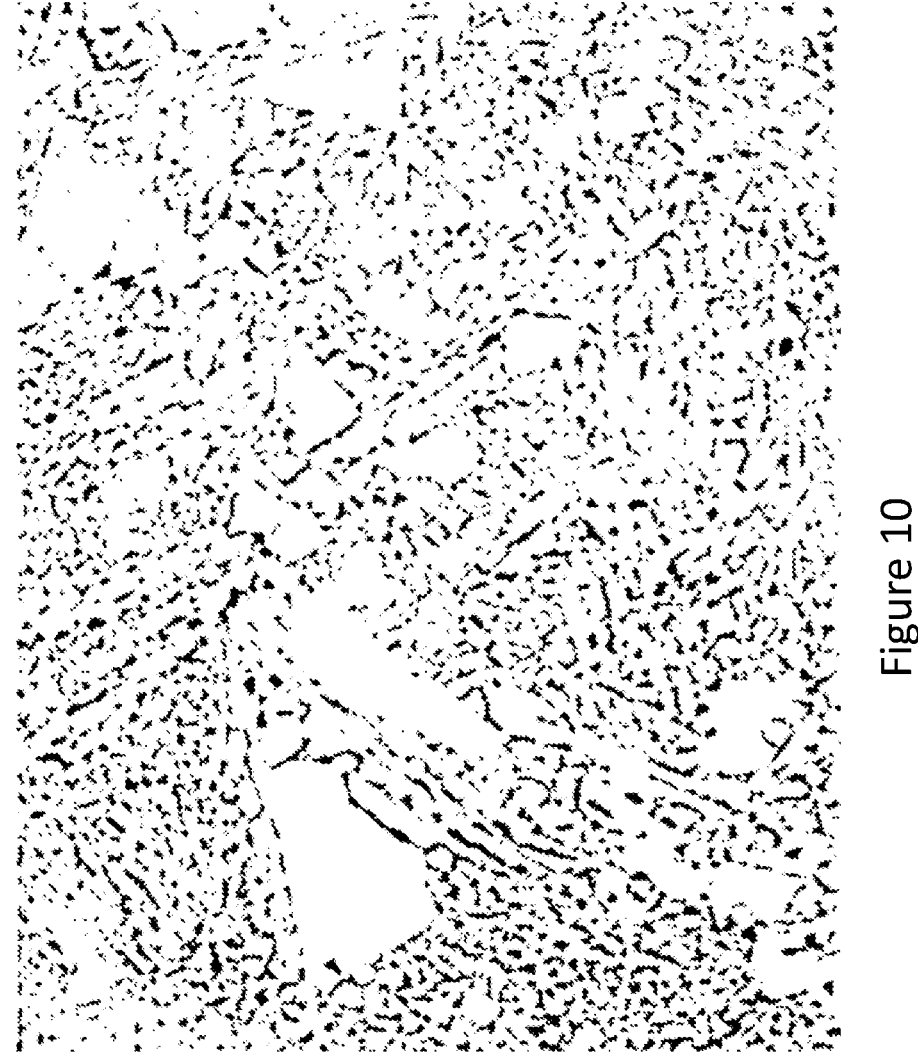
FIG. 10 illustrates a binary image of FIG. 7.
Figure 11:
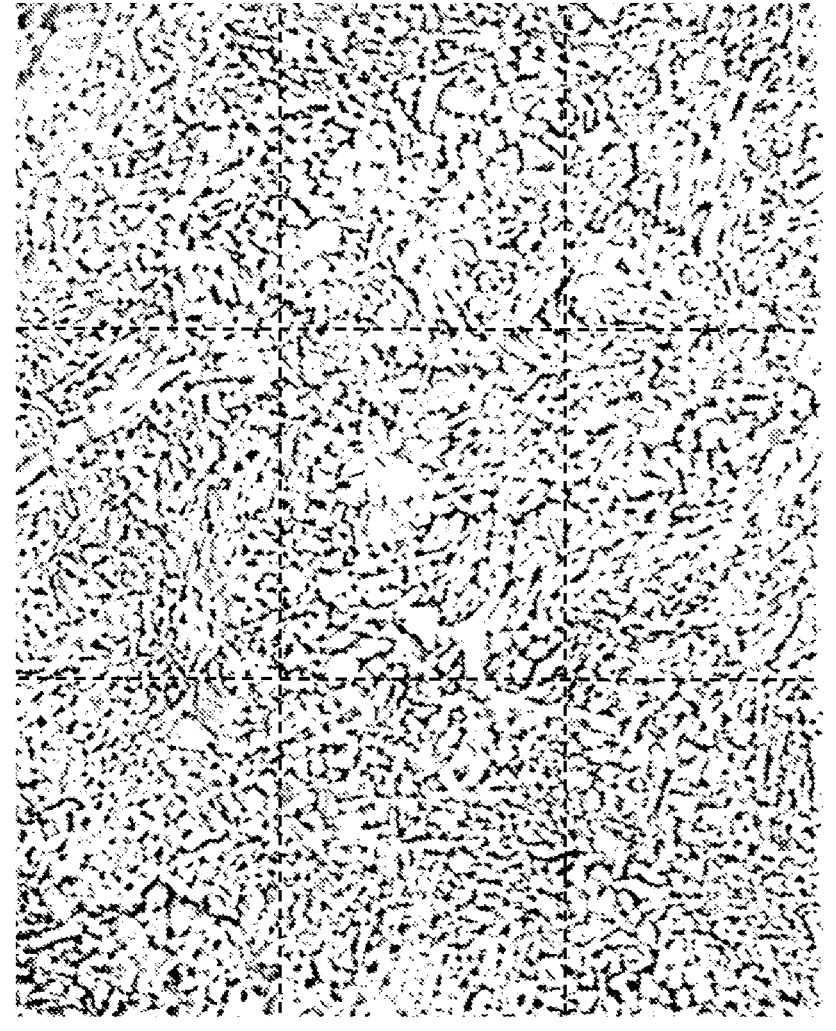
FIG. 11 illustrates a binary image of FIG. 8.

FIG. 9 illustrates a binary image of FIG. 6. FIG. 10 shows a binary image of FIG. 7, which includes an analyzed area fraction of 14.2% and variation of 9.4 when divided into nine parts. FIG. 11 shows a binary image of FIG. 8, which includes an analyzed area fraction of 20.1% and variation of 3.8 when divided into nine parts.

Physical Properties

In the present disclosure, the size of the spheroidal or substantially spherical fused tungsten particle may between 1 to 200 μm. The variation of the size of the spheroidal or substantially spherical fused tungsten particle can results in the change in TRS of the final infiltrated MMC.

The powder particle size distribution is measured and determined by MicroTrac per ASTM B822, hereby incorporated by reference in its entirety. It can be defined by describing 3 points the curve, namely:

D10 or 10th percentile particle diameter (μm)

D50 or average particle diameter (μm)

D90 or 90th percentile particle diameter (μm)

Advantageously, the inventors have discovered that the D50 of the tungsten carbide particles can be tuned to achieve a target value of the TRS. In some embodiments, the MMC formed from spheroidal or substantially spherical fused tungsten carbide particles that have an average particle size (D50) between 1 μm and 10 μm, has a TRS greater than or equal to 360 ksi (or about 360 ksi). In some embodiments of this disclosure, the MMC formed from spheroidal or substantially spherical fused tungsten carbide particles that have an average particle size (D50) between 1 μm and 10 μm, has a TRS greater than or equal to 530 ksi (or about 530 ksi). In some embodiments of this disclosure, the MMC formed from spheroidal or substantially spherical fused tungsten carbide particles that have an average particle size (D50) between 1 μm and 10 μm, has a TRS greater than or equal to 700 ksi (or about 700 ksi). The TRS can have a value in a range defined by any of these values.

In some embodiments, the MMC formed from spheroidal or substantially spherical fused tungsten carbide particles that have an average particle size (D50) between 11 μm and 20 μm, has a TRS greater than or equal to 280 ksi (or about 280 ksi). In some embodiments of this disclosure, the MMC formed from spheroidal or substantially spherical fused tungsten carbide particles that have an average particle size (D50) between 11 μm and 20 μm, has a TRS greater than or equal to 365 ksi (or about 365 ksi). In some embodiments of this disclosure, the MMC formed from spheroidal or substantially spherical fused tungsten carbide particles that have an average particle size (D50) between 11 μm and 20 μm, has a TRS greater than or equal to 450 ksi (or about 450 ksi). The TRS can have a value in a range defined by any of these values.

In some embodiments, the MMC formed from spheroidal or substantially spherical fused tungsten carbide particles that have an average particle size (D50) between 21 μm and 40 μm, has a TRS greater than or equal to 230 ksi (or about 230 ksi). In some embodiments of this disclosure, the MMC formed from spheroidal or substantially spherical fused tungsten carbide particles that have an average particle size (D50) between 21 μm and 40 μm, has a TRS greater than or equal to 260 ksi (or about ksi). In some embodiments of this disclosure, the MMC formed from spheroidal or substantially spherical fused tungsten carbide particles that have an average particle size (D50) between 21 μm and 40 μm, has a TRS greater than or equal to 290 ksi (or about 290 ksi). The TRS can have a value in a range defined by any of these values.

In one embodiment, the MMC formed from spheroidal or substantially spherical fused tungsten carbide particles that have an average particle size (D50) between 41 μm and 60 μm, has a TRS greater than or equal to 180 ksi. In a preferred embodiment of this disclosure, the MMC formed from spheroidal or substantially spherical fused tungsten carbide particles that have an average particle size (D50) between 41 μm and 60 μm, has a TRS greater than or equal to 200 ksi. In a still preferred embodiment of this disclosure, the MMC formed from spheroidal or substantially spherical fused tungsten carbide particles that have an average particle size (D50) between 41 μm and 60 μm, has a TRS greater than or equal to 220 ksi. The TRS can have a value in a range defined by any of these values.

In some embodiments, the MMC formed from spheroidal or substantially spherical fused tungsten carbide particles that have an average particle size (D50) between 61 μm and 80 μm, has a TRS greater than or equal to 160 ksi (or about 160 ksi). In some embodiments of this disclosure, the MMC formed from spheroidal or substantially spherical fused tungsten carbide particles that have an average particle size (D50) between 61 μm and 80 μm, has a TRS greater than or equal to 170 ksi (or about 170 ksi). In some embodiments of this disclosure, the MMC formed from spheroidal or substantially spherical fused tungsten carbide particles that have an average particle size (D50) between 61 μm and 80 μm, has a TRS greater than or equal to 180 ksi (or 180 ksi). The TRS can have a value in a range defined by any of these values.

In some embodiments, the MMC formed from spheroidal or substantially spherical fused tungsten carbide particles that have an average particle size (D50) between 81 μm and 100 μm, has a TRS greater than or equal to 140 ksi (or about 140 ksi). In some embodiments of this disclosure, the MMC formed from spheroidal or substantially spherical fused tungsten carbide particles that have an average particle size (D50) between 81 μm and 100 μm, has a TRS greater than or equal to 150 ksi (or about 150 ksi). In some embodiments of this disclosure, the MMC formed from spheroidal or substantially spherical fused tungsten carbide particles that have an average particle size (D50) between 81 μm and 100 μm, has a TRS greater than or equal to 160 ksi (or about 160 ksi). The TRS can have a value in a range defined by any of these values.

In some embodiments, the MMC formed from spheroidal or substantially spherical fused tungsten carbide particles that have an average particle size (D50) between 101 μm and 200 μm, has a TRS greater than or equal to 100 ksi (or about 100 ksi). In some embodiments of this disclosure, the MMC formed from spheroidal or substantially spherical fused tungsten carbide particles that have an average particle size (D50) between 101 μm and 200 μm, has a TRS greater than or equal to 120 ksi (or about 120 ksi). In some embodiments of this disclosure, the MMC formed from spheroidal or substantially spherical fused tungsten carbide particles that have an average particle size (D50) between 101 μm and 200 μm, has a TRS greater than or equal to 140 ksi (or about 140 ksi). The TRS can have a value in a range defined by any of these values.

Laboratory testing enabled the abrasion and erosion resistance of angular and spherical MMCs to be measured and compared.

An erosion test simulating real drilling condition was carried out by using a modified high-pressure abrasive waterjet cutting machine. A special sample holder adjustable between 0° and 90° was designed to allow the adjustment of the impacting angle between the sample surface and slurry jet. The stand-off distance between the nozzle and the sample was selected as 1,000 mm in order to avoid cutting of the sample and to enlarge the contact area between the jet and sample. The garnet is used as the erodent. The pressure of the waterjet was 50 ksi. The test duration was 10 min. A balance with an accuracy of 1 mg is used to measure the weight of the coupon before and after the test.

An MMC sample incorporating embodiments of the disclosed spherical fused tungsten carbide particles and made by liquid infiltration was tested for erosion at 30° impact angle with volume loss at 0.022 cm$^3$ comparing to conventional counterpart at 0.17 cm$^3$.

In some embodiments of this disclosure, the spherical MMC has an erosive volume loss of 0.10 (or about 0.10) cm$^3$ or lower. In some embodiments of this disclosure, the spherical MMC has an erosive volume loss of 0.08 (or about 0.08) cm$^3$ or less. In some embodiments of this disclosure, the spherical MMC has an erosive volume loss of 0.06 (or about 0.06) cm$^3$ or lower. In some embodiments of this disclosure, the spherical MMC has an erosive volume loss of 0.04 (or about 0.04) cm$^3$ or lower. The volume loss can have a value in a range defined by any of these values.

For standard ASTM 611 high stress abrasion test, hereby incorporated by reference in its entirety, a certain sample made of embodiments of the disclosed material has volume loss of 0.51 cm$^3$ comparing to conventional MMCs of 1.28 cm$^3$ volume loss.

In some embodiments of this disclosure, the spherical MMC has an ASTM 611 volume loss of 1.00 (or about 1.00) cm$^3$ or lower. In some embodiments of this disclosure, the spherical MMC has an ASTM 611 volume loss of 0.80 (or about 0.80) cm$^3$ or lower. In some embodiments of this disclosure, the spherical MMC has an ASTM 611 volume loss of 0.60 (or about 0.60) cm$^3$ or lower. The volume loss can have a value in a range defined by any of these values.

ADDITIONAL EXAMPLES

1. A powder blend comprising fused tungsten carbide particles, wherein the fused tungsten carbide particles comprise:

a spheroidal shape having ratio of a first length along a major axis to second length along a minor axis that is 1.20 or lower; and a surface that is textured to have a grain boundary area fraction greater than 5.0%.

2. The powder blend of Example 1, further comprising metallic tungsten particles.

3. The powder blend of Examples 1 or 2, wherein the textured surface has a needle-like topography.

4. The powder blend of any one of Examples 1-3, wherein the needle-like topography comprises needle-like structures elongated along surfaces of the tungsten carbide particles, wherein at least some of the needle-like structures have a portion having a width not exceeding 1 μm.

5. The powder blend of any one of Examples 1-4, wherein the powder blend is configured to form a metal-matrix composite (MMC) including the fused tungsten carbide particles embedded in a matrix.

6. The powder blend of Example 5, wherein the matrix comprises copper or a copper alloy.

7. The powder blend of any one of Examples 1-6, wherein the powder blend is configured to form a high strength MMC that has a Weibull modulus of 15 or greater.

8. The powder blend of any one of Examples 1-7, wherein the powder blend is configured to form a high strength MMC that has a linear extrapolation of the Weibull plot to a 1 in 10,000 probability of failure that equates to an applied stress of 80 ksi or greater.

9. The powder blend of any one of Examples 1-8, wherein the powder blend is used to form a high strength MMC that has an erosive volume loss of 0.10 cm$^3$ or lower.

10. The powder blend of any one of Examples 1-9, wherein the powder blend is configured to form a high strength MMC that has an ASTM 611 volume loss of 1.00 cm$^3$ or lower.

11. The powder blend of any one of Examples 1-10, wherein the powder blend is configured to form a portion of a high strength drill bit including a metal-matrix composite (MMC) including the fused tungsten carbide particles and a copper or copper alloy matrix.

12. The powder blend of any one of Examples 1-11, wherein the fused tungsten carbide particles have an average particle size of 1-200 μm.

13. A metal matrix composite (MMC) material, comprising:

fused tungsten carbide particles having a spheroidal shape and a surface that is textured to have a grain boundary area fraction greater than 5.0%; and a matrix having embedded therein the fused tungsten carbide particles.

14. The MMC material of Example 13, wherein at least some of the fused tungsten carbide particles have a ratio of a first length along a major axis to second length along minor axis length that is 1.20 or lower.

15. The MMC material of Examples 13 or 14, wherein the matrix comprises copper or a copper alloy.

16. The MMC material of any one of Examples 13-15, wherein the MMC material has a Weibull modulus of 15 or greater.

17. The MMC material of any one of Examples 13-16, wherein the MMC material has a linear extrapolation of the Weibull plot to a 1 in 10,000 probability of failure that equates to an applied stress of 80 ksi or greater.

18. The MMC material of any one of Examples 13-17, wherein the MMC material has an erosive volume loss of 0.10 cm³ or lower.

19. The MMC material of any one of Examples 13-18, wherein the MMC material has an ASTM 611 volume loss of 1.00 cm³ or lower.

20. The MMC material of any one of Examples 13-19, wherein the fused tungsten carbide particles have a D50 between 1 μm and 10 μm and the MMC material has a transverse rupture strength of 360 ksi or greater.

21. The MMC material of any one of Examples 13-20, wherein the fused tungsten carbide particles have a D50 between 11 μm and 20 μm and the MMC material has a transverse rupture strength of 280 ksi or greater.

22. The MMC material of any one of Examples 13-21, wherein the fused tungsten carbide particles have a D50 between 21 μm and 40 μm and the MMC has a transverse rupture strength of 230 ksi or greater.

23. The MMC material of any one of Examples 13-22, wherein the fused tungsten carbide particles have a D50 between 41 μm and 60 μm and the MMC has a transverse rupture strength of 180 ksi or greater.

24. The MMC material of any one of Examples 13-23, wherein the fused tungsten carbide particles have a D50 between 61 μm and 80 μm and the MMC has a transverse rupture strength of 160 ksi or greater.

25. The MMC material of any one of Examples 13-24, wherein the fused tungsten carbides have a D50 between 81 μm and 100 μm and the MMC has a transverse rupture strength of 140 ksi or greater.

26. The MMC material of any one of Examples 13-25, wherein the fused tungsten carbides have a D50 between 101 μm and 200 μm and the MMC has a Transverse Rupture Strength of 100 ksi or greater.

27. The MMC material of any one of Examples 13-26, wherein the MMC material forms part of a high strength drill bit.

28. A method of forming a metal-matrix composite (MMC) material, the method comprising:

adding into a mold fused tungsten carbide particles having a spheroidal shape and a surface that is textured to have a grain boundary area fraction greater than 5.0%;

adding a binder material comprising copper into the mold;

melting the binder material to infiltrate the fused tungsten carbide particles; and solidifying the molten binder material to form the MMC material.

29. The method of Example 28, wherein the fused tungsten carbide particles have the grain boundary area fraction of at least 10.0%.

30. The method of Examples 28 or 29, wherein the fused tungsten carbide particles have the grain boundary area fraction of at least 12.0%.

31. The method of any one of Examples 28-30, wherein the fused tungsten carbide particles have the grain boundary area fraction of at least 20.0%.

32. The method of any one of Examples 28-31, wherein the MMC material has a Weibull modulus of 15 or greater.

33. The method of any one of Examples 28-32, wherein the MMC material has a Weibull modulus of 20 or greater.

34. The method of any one of Examples 28-33, wherein the MMC material has a Weibull modulus of 25 or greater.

35. The method of any one of Examples 28-34, wherein a linear extrapolation to a 1 in 10,000 probability of failure for the MMC material equates to 80 ksi or greater.

36. The method of any one of Examples 28-35, wherein a linear extrapolation to a 1 in 10,000 probability of failure for the MMC material equates to 140 ksi or greater.

37. The method of any one of Examples 28-36, wherein a linear extrapolation to a 1 in 10,000 probability of failure for the MMC material equates to 180 ksi or greater.

38. The method of any one of Examples 28-37, wherein the MMC material has a transverse rupture strength of at least 140 ksi.

39. The method of any one of Examples 28-38, wherein the MMC material has a transverse rupture strength of at least 450 ksi.

40. The method of any one of Examples 28-39, wherein the MMC material has a transverse rupture strength of at least 700 ksi.

41. The method of any one of Examples 28-40, wherein the MMC material has an erosive volume loss of 0.10 cm³ or less.

42. The method of any one of Examples 28-41, wherein the MMC material has an erosive volume loss of 0.08 cm³ or less.

43. The method of any one of Examples 28-42, wherein the MMC material has an erosive volume loss of 0.04 cm³ or less.

44. The method of any one of Examples 28-43, wherein the method comprises forming the MMC material as part of a high strength drill bit, wherein the method further comprises adding steel components into the mold, and wherein melting the binder material comprises at least partially encompassing the steel component.

45. A high strength drill bit comprising:

a metal matrix composite comprising fused tungsten carbide particles within a matrix, wherein the fused tungsten carbide particles have a spheroidal shape and a surface that is textured to have a grain boundary area fraction of at least 5.0%. 46. The drill bit of Example 45, wherein the fused tungsten carbide particles have a grain boundary area fraction of at least 10.0%.

47. The drill bit of Examples 45 or 46, wherein the fused tungsten carbide particles have a grain boundary area fraction of at least 12.0%.

48. The drill bit of any one of Examples 45-47, wherein the fused tungsten carbide particles have a grain boundary area fraction of at least 20.0%.

49. The drill bit of any one of Examples 45-48, wherein the metal matrix composite has a Weibull modulus of 15 or greater.

50. The drill bit of any one of Examples 45-49, wherein the metal matrix composite has a Weibull modulus of 20 or greater.

51. The drill bit of any one of Examples 45-50, wherein the metal matrix composite has a Weibull modulus of 25 or greater.

52. The drill bit of any one of Examples 45-51, wherein a linear extrapolation to a 1 in 10,000 probability of failure for the metal matrix composite equates to 80 ksi or greater.

53. The drill bit of any one of Examples 45-52, wherein a linear extrapolation to a 1 in 10,000 probability of failure for the metal matrix composite equates to 140 ksi or greater.

54. The drill bit of any one of Examples 45-53, wherein a linear extrapolation to a 1 in 10,000 probability of failure for the metal matrix composite equates to 180 ksi or greater.

55. The drill bit of any one of Examples 45-54, wherein the metal matrix composite has a transverse rupture strength of at least 140 ksi.

56. The drill bit of any one of Examples 45-55, wherein the metal matrix composite has a transverse rupture strength of at least 450 ksi.

57. The drill bit of any one of Examples 45-56, wherein the metal matrix composite has a transverse rupture strength of at least 700 ksi.

58. The drill bit of any one of Examples 45-57, wherein the metal matrix composite has an erosive volume loss of 0.10 cm$^3$ or less.

59. The drill bit of any one of Examples 45-58, wherein the metal matrix composite has an erosive volume loss of 0.08 cm$^3$ or less.

60. The drill bit of any one of Examples 45-59, wherein the metal matrix composite has an erosive volume loss of 0.04 cm$^3$ or less.

From the foregoing description, it will be appreciated that inventive products and approaches for alloys are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A powder blend comprising fused tungsten carbide particles, wherein the fused tungsten carbide particles comprise:

a spheroidal shape having a ratio of a first length along a major axis to a second length along a minor axis of 1.2 or lower;

a textured external surface comprising a grain boundary area fraction greater than 5%; and an external surface composition comprising fused tungsten carbide.

2. The powder blend of claim 1, further comprising metallic tungsten particles.

3. The powder blend of claim 1, wherein the textured external surface comprises a needle-like topography.

4. The powder blend of claim 3, wherein the needle-like topography comprises needle-like structures elongated along surfaces of the tungsten carbide particles, wherein at least some of the needle-like structures comprise a portion having a width not exceeding 1 μm.

5. The powder blend of claim 4, wherein at least some of the needle-like structures further comprise a ratio of a longest length to a smallest width that exceeds 2.

6. The powder blend of claim 1, wherein the powder blend is configured to form a metal-matrix composite (MMC) material comprising the fused tungsten carbide particles embedded in a matrix.

7. The powder blend of claim 6, wherein the matrix comprises copper or a copper alloy.

8. The powder blend of claim 6, wherein the MMC material has a Weibull modulus of 15 or greater.

9. The powder blend of claim 6, wherein the MMC material has a linear extrapolation of a Weibull plot to a 1 in 10,000 probability of failure that equates to an applied stress of 80 ksi or greater.

10. The powder blend of claim 6, wherein the MMC material has a high-pressure abrasive waterjet erosive volume loss of 0.1 cm³ or lower.

11. The powder blend of claim 6, wherein the MMC material has an ASTM 611 volume loss of 1 cm³ or lower.

12. The powder blend of claim 1, wherein the fused tungsten carbide particles comprise an average particle size of 1-200 μm.

13. The powder blend of claim 1, wherein the fused tungsten carbide particles comprise a fused tungsten carbide internal microstructure.

14. The powder blend of claim 1, wherein the fused tungsten carbide particles comprise a fused tungsten carbide particle composition consisting essentially of fused tungsten carbide.

15. The powder blend of claim 1, wherein the fused tungsten carbide particles comprise a specific density of about 16.5 g/cm³.

16. The powder blend of claim 1, wherein the fused tungsten carbide particles comprise a micro-hardness of about 2700-3300 HV.

17. The powder blend of claim 1, wherein the fused tungsten carbide particles comprise a fused tungsten carbide particle composition comprising:

carbon: about 3.7-4.2 wt. %; and tungsten: balance.

18. The powder blend of claim 1, wherein the fused tungsten carbide particles comprise an internal composition comprising fused tungsten carbide.

19. The powder blend of claim 18, wherein the external surface composition and the internal composition each independently comprise:

carbon: about 3.7-4.2 wt. %; and tungsten: balance.

20. The powder blend of claim 18, wherein the external surface composition and the internal composition are substantially the same.

21. The powder blend of claim 1, wherein the fused tungsten carbide particles have at least one of:

a D50 between 1 μm and 10 μm;

a D50 between 11 μm and 20 μm;

a D50 between 21 μm and 40 μm;

a D50 between 41 μm and 60 μm;

a D50 between 61 μm and 80 μm;

a D50 between 81 μm and 100 μm; and a D50 between 101 μm and 200 μm.

22. The powder blend of claim 1, wherein the fused tungsten carbide particles comprise a first D50 particle size distribution of 41-80 μm, and a second D50 particle size distribution of 61-200 μm.

23. A method of forming a metal-matrix composite (MMC) material, the method comprising:

adding the powder blend of claim 1 into a mold;

adding a binder material comprising copper into the mold;

melting the binder material to infiltrate the fused tungsten carbide particles; and solidifying the molten binder material to form the MMC material.

24. The method of claim 23, wherein the fused tungsten carbide particles comprise the grain boundary area fraction of at least 10%.

25. The method of claim 23, wherein the MMC material has a Weibull modulus of 15 or greater.

26. The method of claim 23, wherein a linear extrapolation to a 1 in 10,000 probability of failure for the MMC material equates to 80 ksi or greater.

27. The method of claim 23, wherein the MMC material has a transverse rupture strength of at least 140 ksi.

28. The method of claim 23, wherein the method comprises forming the MMC material as part of a high strength drill bit, wherein the method further comprises adding steel components into the mold, and wherein melting the binder material comprises at least partially encompassing the steel component.

* * * * *